United States Patent
Chidlovskii et al.

(10) Patent No.: US 11,263,756 B2
(45) Date of Patent: Mar. 1, 2022

(54) METHOD AND APPARATUS FOR SEMANTIC SEGMENTATION AND DEPTH COMPLETION USING A CONVOLUTIONAL NEURAL NETWORK

(71) Applicant: NAVER CORPORATION, Gyeonggi-do (KR)

(72) Inventors: Boris Chidlovskii, Meylan (FR); Giorgio Giannone, Civita Castellana (IT)

(73) Assignee: NAVER CORPORATION, Gyeonggi-Do (KR)

( * ) Notice: Subject to any disclaimer, the term of this patent is extended or adjusted under 35 U.S.C. 154(b) by 117 days.

(21) Appl. No.: 16/707,404

(22) Filed: Dec. 9, 2019

(65) Prior Publication Data

US 2021/0174513 A1    Jun. 10, 2021

(51) Int. Cl.
| | |
|---|---|
| *G06T 7/174* | (2017.01) |
| *G06N 3/08* | (2006.01) |
| *G06N 3/04* | (2006.01) |
| *G06N 20/20* | (2019.01) |

(52) U.S. Cl.
CPC ........... *G06T 7/174* (2017.01); *G06N 3/0454* (2013.01); *G06N 3/08* (2013.01); *G06N 20/20* (2019.01); *G06T 2207/10024* (2013.01); *G06T 2207/10028* (2013.01); *G06T 2207/20081* (2013.01); *G06T 2207/20084* (2013.01)

(58) Field of Classification Search
CPC ........... G06T 7/174; G06T 2207/10024; G06T 2207/10028; G06T 2207/10032; G06T 2207/10016; G06T 2207/20081; G06T 2207/20084; G06T 2207/20072; G06T 2207/20048; G06T 7/40; G06T 7/50; G06T 7/55; G06N 20/20; G06N 3/0454; G06N 3/0445; G06N 3/04; G06N 3/02
USPC ................................ 382/173, 180, 155–160
See application file for complete search history.

(56) References Cited

U.S. PATENT DOCUMENTS

| | | | |
|---|---|---|---|
| 9,704,257 B1 * | 7/2017 | Tuzel | G06K 9/6297 |
| 11,004,208 B2 * | 5/2021 | Price | G06N 3/0454 |

FOREIGN PATENT DOCUMENTS

CN        107403430 A    *   11/2017

OTHER PUBLICATIONS

V. Mirjalili, S. Raschka, A. Namboodiri and A. Ross, "Semi-adversarial Networks: Convolutional Autoencoders for Imparting Privacy to Face Images," 2018 International Conference on Biometrics (ICB), 2018, pp. 82-89, doi: 10.1109/ICB2018.2018.00023. (Year: 2018).*

(Continued)

*Primary Examiner* — Claire X Wang
*Assistant Examiner* — Stephen M Brinich

(57) ABSTRACT

A computer-implemented method for generating a semantically segmented image and a depth completion image using a convolutional neural network (CNN) from an input visible image and/or an input depth image. A central component of the CNN for semantic segmentation and depth completion is a common representation that allows both tasks to be performed when given any of these combinations of input images (i) both an input visible image and an input depth image, (ii) only an input visible image, or (iii) only an input depth image.

20 Claims, 13 Drawing Sheets

(56) References Cited

OTHER PUBLICATIONS

X. Deng and P. L. Dragotti, "Deep Convolutional Neural Network for Multi-modal Image Restoration and Fusion," in IEEE Transactions on Pattern Analysis and Machine Intelligence, doi: 10.1109/TPAMI.2020.2984244. (Year: 2020).*
Shi, J., Sun, Y., Bai, S. et al. A self-supervised method of single-image depth estimation by feeding forward information using max-pooling layers. Vis Comput 37, 815-829 (2021). (Year: 2021).*
A. Valada, J. Vertens, A. Dhall, and W. Burgard. Adapnet: Adaptive semantic segmentation in adverse environmental conditions. In 2017 IEEE Intern. Conf. Robotics and Automation (ICRA), pp. 4644-4651, May 2017.
Alberto Garcia-Garcia, Sergio Orts, Serglu Oprea, Victor VillenaMartiez, and Jose Garc ' ia Rodr'iguez. A review on deep learning techniques spotted to semantic segmentation. CoRR, abs/1704.06857v1, 2017.
Alex Kendall, Vijay Badrinarayanan, and Roberto Cipolla, Bayesian segnet Model uncertainly in.deep convolutional encoder-ecoder architectures for scene understanding. arXiv preprint arXiv:1511.02680v2, 2016.
Andreas Eitel, Jost Tobias Springenberg, Luciano Spinello, Martin A. Riedmiller, and Wolfram Burgard. Multimodal deep learning for robust rgb-d object recognition. IEEE/RSJ Intern. Conf. Intelligent Robots and Systems (IROS), pp. 681-687, 2015.
Anirban Roy and Sinisa Todorovic. Monocular depth estimation using neural regression forest. In Proc. CVPR, pp. 5506-5514, 2016.
Ankur Handa, Viorica Patraucean, Vijay Badrinarayanan, Simon Stent, and Roberto Cipolla. Understanding real world indoor scenes with synthetic data. In Proc. CVPR, pp. 4077-4085, 2016.
Bo Li, Chunhua Shen, Yuchao Dai, Anton Van Den Hengel, and Mingy He, Depth and surface normal estimation from monocular images using regression on deep features and hierarchical crfs. In Proc. CVPR, pp. 1119-1127, 2015.
Caner Hazirbas, Lingni Ma, Csaba Domokos, and Daniel Cremers. Fusenet: Incorporating depth into semantic segmentation via fusionbased cnn architecture. In ACCV, 2016.
Chandar, A.P.S., Khapra, M.M., Larochelle, H., Ravindran, B., entitled "Correlational neural networks", published in Neural Computation 28 2:257-85, 2016.
Chen, L., Papandreou, G., Kokkinos, I., Murphy, K., Yuille, A.L., entitled "DeepLab: Semantic Image Segmentation with Deep Convolutional Nets, Atrous Convolution, and Fully Connected CRFs", in IEEE Trans. Pattern Anal. Mach. Intell. 40(4) pp. 834-848, May 2017.
David Eigen and Rob Fergus. Predicting depth, surface normals and semantic labels with a common multi-scale convolutional architecture. In Proc. IEEE ICCV, pp. 2650-2658, 2015.
Di Lin, Guangyong Chen, Daniel Cohen-Or, Pheng-Ann Heng, and Hui Huang. Cascaded feature network for semantic segmentation of rgb-d images. In Proc. ICCV, pp. 1320-1328. IEEE, 2017.
Eigen, D., Puhrsch, C., Fergus, R., in the publication entitled "Depth map prediction from a single image using a multiscale deep network", published in Proceedings of the 27th International Conference on Neural Information Processing Systems—vol. 2. NIPS'14, Cambridge, MA, USA, MIT Press, pp. 2366-2374, 2014).
Falong Shen, Rui Gan, Shuicheng Yan, and Gang Zeng. Semantic segmentation via structured patch prediction, context crf and guidance crf. In Proc. IEEE CVPR, vol. 8, 2017.
Giannone, Giorgia, et al.; "Learning Common Representation from RGB and Depth Images;" arXiv: 1812.06873v1 [cs.AI]; Dec. 17, 2018.
Guosheng Lin, Anton Milan, Chunhua Shen, and Ian D Reid. Refinenet: Multi-path refinement networks for high-resolution semantic segmentation. In Proc. CVPR, vol. 1, p. 5, 2017.
Gupta, S., Girshick, R., Arbelaez, P., Malik, J. in "Learning rich features from RGB-D images for object detection and segmentation" published in Fleet, D., Pajdia, T., Schiele, B., Tuytelaars, T., eds.: Proceedings of European Conference on Computer Vision, vol. 8695 of Lecture Notes in Computer Science., Zurich, Switzerland, Springer, pp. 345-360, 2014.
Hazirbas, C., Ma, L., Domokos, C., Cremers, D. in "Fusenet: Incorporating Depth into Semantic Segmentation via Fusion-based CNN Architecture", published in ACCV, 2016).
Huikai Wu et al., entitled "FastFCN: Rethinking Dilated Convolution in the Backbone for Semantic Segmentation", in arXiv preprint arXiv:1903.11816, 2019.
Iro Laina, Christian Rupprecht, Vasileios Belagiannis, Federico Tombari, and Nassir Navab. Deeper depth prediction with fully convolutional residual networks. In 4th Intern. Conf. on 3D Vislon (3DV), pp. 239-248. IEEE, 2016.
Jindong Jiang, Zhijun Zhang, Yongqian Huang, and Lunan Zheng. Incorporating depth into both CNN and CRF for indoor semantic segmentation. CoRR, abs/1705.07383v4, 2018.
Jiquan Ngiam, Aditya Khosla, Mingyu Kim, Juhan Nam, Honglak Lee, and Andrew Y. Ng. Multimodal deep learning. In Proc. ICML, 2011.
Joel Janai, Fatma Guney, Aseem Behl, and Andreas Gelger, Computer vision for autonomous vehicles: Problems, datasets and state-of-the-art. CoRR, abs/1704.05519v1, 2017.
Lingni Ma, Jorg Stuckler, Christian Kerl, and Daniel Cremers. Multi-view deep learning for consistent semantic mapping with rgb-d cameras.IEEE/RSJ Inter. Conf. Intelligent Robots and Systems (IROS), pp. 598-605, 2017.
Lubor Ladicky, Jianbo Shi, and Marc Pollefeys. Pulling things out of perspective. Proc. IEEE CVPR, pp. 89-96, 2014.
Ma, L., Stückler, J., Kerl, C., Cremers, D., in "Multi-View Deep Learning for Consistent Semantic Mapping with RGB-D Cameras", published in IEEE/RSJ International Conference on Intelligent Robots and Systems (IBOS), pp. 598-605, 2017.
Marius Cordts, Mohamed Omran, Sebastian Ramos, Timo Rehfeld, Markus Enzweiler, Rodrigo Benenson, Uwe Franke, Stefah Roth, and Bernt Schiele. The cityscapes dataset for semantic urban scene understanding. Proc. CVPR, pp. 3213-3223, 2016.
Nathan Silberman,, Pushmeet Kohli, Derek Hoiem and Rob Fergus, Indoor segmentation and support inference from rgbd images. In Proc. ECCV, 2012.
Peng Wang, Xiaohui Shen, Zhe L. Lin, Scott Cohen, Brian L. Price, and Alan L. Yuille. Towards unified depth and semantic prediction from a single image. Proc. IEEE CVPR, pp. 2800-2809, 2015.
Ross B. Girshick. Fast R-CNN. CoRR, abs/1504.08083v2, 2015.
Saurabh Gupta, Ross B. Girshick, Pablo Andres Arbel ' aez, and Jitendra ' Malik. Learning rich features from rgb-d images for object detection and segmentation. In Proc. ECCV, 2014.
Shuran Song, Samuel P. Lichtenberg, and Jianxiong Xiao. SUN RGB-D: A RGB-D scene understanding benchmark suite shuran. In Proc. CVPR, 2015.
Tadas Baltrusaitis, Chaitanya Ahuja, and Louis-Philippe Morency. Multimodal machine learning: A survey and taxonomy. CORR, abs/1705.09406v1, 2017.
Vijay Badrinarayanan, Alex Kendall, and Roberto Cipoila. Segnet: A deep convolutional encoder-decoder architecture for image segmentation. arXv:1511.00561v3, Oct. 10, 2016.
Yinda Zhang and Thomas A. Funkhouser. Deep depth completion of a single RGB-D image. CoRR, abs/1803.09326, 2018.

* cited by examiner

METHOD AND APPARATUS FOR SEMANTIC SEGMENTATION AND DEPTH COMPLETION USING A CONVOLUTIONAL NEURAL NETWORK

FIELD

The field of the disclosure relates to machine learning, and more particularly methods for training a convolutional neural network for semantic segmentation and/or depth completion of images, and for using such convolutional neural network.

BACKGROUND

Computer vision is a field of endeavor which aims at providing computers with high-level understanding from digital images. It seeks to automate tasks that the human visual system can do. One of these tasks is known as "semantic" segmentation.

Generally, segmentation is the process of partitioning an image into sets of pixels. More specifically, when each of these sets of pixels corresponds to an entity whose type can be identified (e.g., a car, a person, a building, etc.), the segmentation is semantic. In practice, semantic segmentation consists in assigning a class label to each pixel among a predetermined set of classes.

Semantic segmentation has a strong interest in many applications that require an understanding of scenes to assist with navigation, including robotics and autonomous driving. In a similar context, semantic segmentation may be used in augmented reality to understand scenes (e.g., to find virtual objects in scenes and regions in which virtual objects may be added).

For semantic segmentation, RGB-D cameras may be used to collect color and depth information for different computer vision tasks. Information collected by the depth camera is complementary to RGB images. Advantageously, the information collected by the depth camera may potentially help decode structural information of the scene and improve the performance of semantic segmentation.

A Convolutional Neural Network (CNN) is a type of Neural Network that has a connection pattern between the neurons inspired by the visual cortex of animals. A CNN is suitable for image processing, and more specifically semantic segmentation, as they may be used to recognized entities in images.

After a supervised learning stage, where a CNN is trained by feeding it a training set of images that is already segmented (i.e. provided with the labels of to each pixel in the frames of the videos), the CNN may be used at runtime to segment inputted images (i.e., unsegmented images that are input to the CNN).

When RGB images are augmented with depth information, one possibility is to incorporate the depth information into a semantic segmentation framework. Different so-called "fusion-based" methods have been developed (including deep features pooling, dense feature, multiscale fusion, etc.) that enable such an incorporation.

Such fusion-based methods, like FuseNet (as disclosed by Hazirbas, C., Ma, L., Domokos, C., Cremers, D. in "Fusenet: Incorporating Depth into Semantic Segmentation via Fusion-based CNN Architecture", published in ACCV, 2016) use an encoder-decoder architecture, where the encoder part is composed of two branches of networks that simultaneously extract features from RGB and depth images and fuse depth features into the RGB feature maps as the network goes deeper. Moreover, training individual RGB and depth modality models has been replaced with joint learning. It has been shown that the semantics predictions of a jointly learned network can be fused more consistently than predictions of a network trained on individual views (see the disclosure by Ma, L., Stückler, J., Kerl, C., Cremers, D., in "Multi-View Deep Learning for Consistent Semantic Mapping with RGB-D Cameras", published in IEEE/RSJ International Conference on Intelligent Robots and Systems (IROS), pp. 598-605, 2017).

Such existing methods, whether modality models are independently or jointly trained, assume the dominance of the RGB modality, eventually complementing it with depth information. Further, such existing methods adopt the fusion-based representation which benefits by complementing the RGB modality with the depth modality to reduce the uncertainty of segmentation and labelling.

However, such existing fusion-based approaches requires both modalities (i.e., RGB and depth images) to be available when training the models and using them at runtime. Should one of the two modalities be missing (e.g., because of a faulty depth camera), segmentation using such methods does not operate as intended. In such cases, RGB segmentation may be relied on (but with a loss of performance). In a more complex alternative, an additional CNN may be used to estimate a depth image from the RGB image (i.e. reconstruct the depth image); the estimated depth image is then used as input in the fusion-based approach (but again with a loss of performance).

There continues therefore to be a need for improved segmentation methods that overcome these and other problems. In particular, there continues to be a need for more robust and fault-tolerant segmentation methods that have consistent and improved results.

SUMMARY

In accordance with one aspect of the disclosure, a computer implemented method trains a convolutional neural network for semantic segmentation and depth completion of images using a training set of image pairs, with each image pair in the training set having a visible image ($x_i$) and a corresponding depth image ($d_i$), where at least one of the visible image ($x_i$) and the corresponding depth image ($d_i$) is semantically segmented. The method includes training a first subnetwork (S1), a second subnetwork (S2) and a third subnetwork (S3).

The first subnetwork (S1) is a first encoder-decoder network with: (i) an encoder branch that generates an outputted first feature map ($x_i^p$) from a visible image ($x_i$), and (ii) a decoder branch that generates a semantically segmented image ($\hat{x}_i$) from an inputted first feature map ($x_i^r$), where during training the encoder branch and the decoder branch of the first subnetwork (S1) are directly connected for setting the inputted first feature map ($x_i^r$) as the outputted first feature map ($x_i^p$).

The second subnetwork (S2) is a second encoder-decoder network with: (i) an encoder branch of the second subnetwork (S2) generating an outputted second feature map ($d_i^p$) from a depth image ($d_i$), and (ii) a decoder branch of the second subnetwork (S2) either generating a semantically segmented image or a depth image ($\hat{d}_i$) from an inputted second feature map ($d_i^r$), where during training the encoder branch and the decoder branch of the second subnetwork (S2) are directly connected for setting the inputted second feature map ($d_i^r$) as the outputted second feature map ($d_i^p$).

The third subnetwork (S3) is arranged between the encoder branch and the decoder branch of the first subnetwork (S1) and the second subnetwork (S2) to reconstruct (i) the inputted first feature map $(x_i^r)$ from the outputted first feature map $(x_i^p)$ and (ii) the inputted second feature map $(d_i^r)$ from the outputted second feature map $(d_i^p)$, where the third subnetwork S3 is trained to generate a common representation of the outputs reconstructed feature maps $x^r$ for visible images and $d^r$ for depth images, allowing either the view from the first subnetwork (S1) or the view from the second subnetwork (S2) to be reconstructed therefrom.

In accordance with another aspect of the invention, a computer-implemented method for semantic segmentation and/or depth completion of an inputted visible image and/or an inputted depth image includes: (a) accessing the trained convolutional neural network (CNN) for semantic segmentation and depth completion of images, and (b) performing semantic segmentation and/or depth completion of the inputted visible image and/or the inputted depth image using the CNN, where the first subnetwork (S1) of the CNN receives as input the inputted visible image and/or the second subnetwork (S2) of the CNN receives as input the inputted depth image.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The drawings are only for purposes of illustrating various embodiments and are not to be construed as limiting, wherein:

FIGS. 2A, 2B, 2C-1, 2C-2, 2C-3, 2D-1, 2D-2 and 2D-3 illustrate embodiments of a convolutional neural network for semantic segmentation and depth completion of images;

FIG. 3 sets forth a training method for training a convolutional neural network for semantic segmentation and/or depth completion of images;

DETAILED DESCRIPTION

Figure 1:
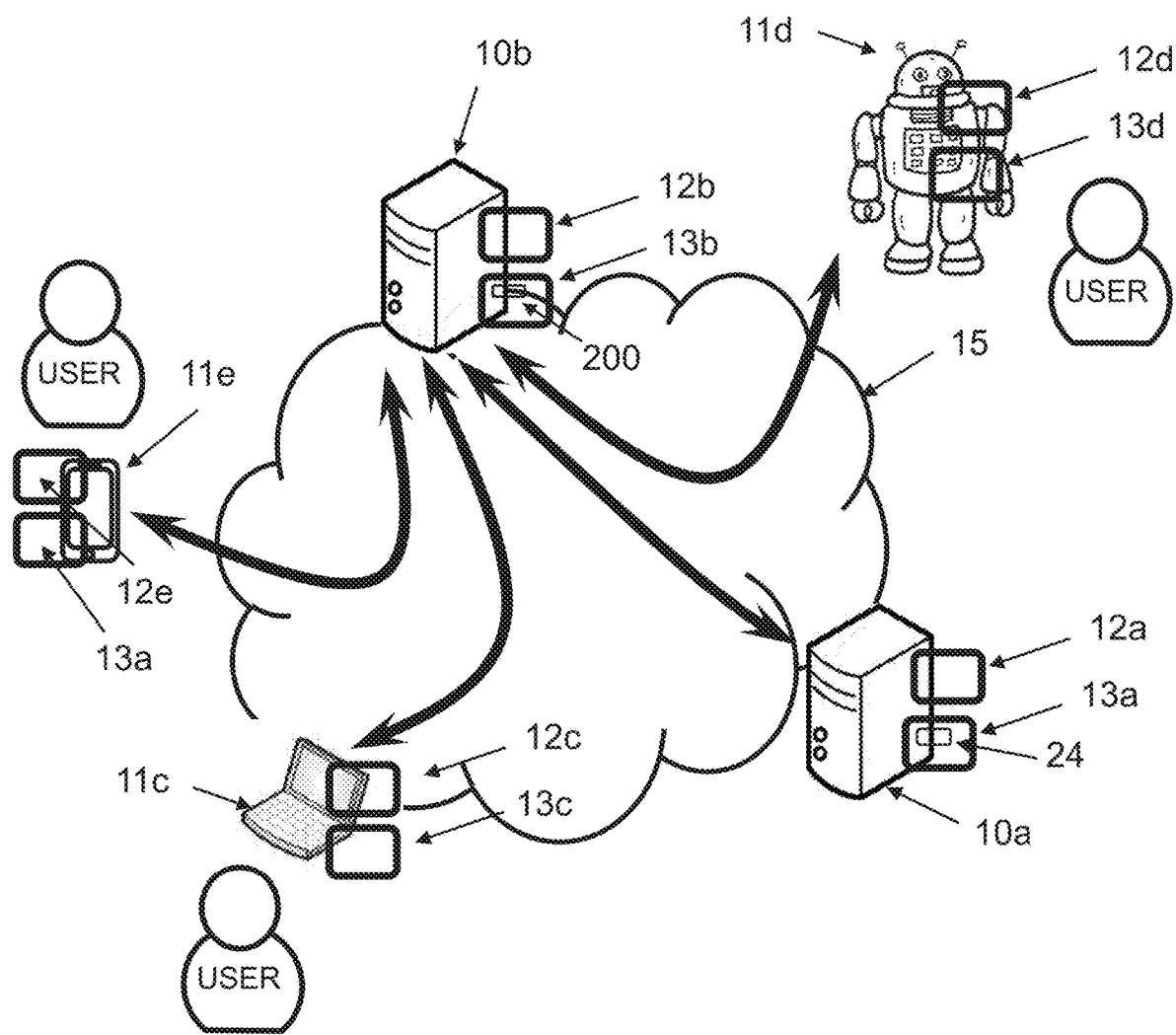
FIG. 1 illustrates an example of a system architecture for training and using a convolutional neural network for semantic segmentation and depth completion of images.

Described herein are embodiments of methods and systems for training and using a Convolutional Neural Network (CNN) for semantic segmentation and depth completion of an inputted visible image (i.e., an RGB image input to the CNN) or an inputted depth image (i.e., a depth image input to the CNN). For purposes of explanation, numerous examples and specific details are set forth in order to provide a thorough understanding of the described embodiments. Embodiments as defined by the claims may include some or all of the features in these examples alone or in combination with other features described below and may further include modifications and equivalents of the features and concepts described herein. The illustrative embodiments are described with reference to the drawings wherein reference numbers may be reused to identify similar and/or identical elements. Further, where an embodiment is a method, steps and elements of the method may be combinable in parallel or sequential execution.

As used herein a "visible image" is an image of a scene as acquired by a camera. In one embodiment, a visible image is one with three color channels (e.g., an RGB image, where each pixel is defined by three intensity values, one for each primary color red, green and blue). In another embodiment, a visible image may be a grayscale image.

As used herein a "depth image", or depth map, is an image containing information relating to the distance of the surfaces of scene objects from a viewpoint. In one embodiment, each pixel of a depth image is encoded using a depth value (i.e., the (raw) depth image is a one channel image, generally, nearer surfaces are darker and farther surfaces are lighter). In another embodiment, depth information of a depth image encoded as an HHA representation (as disclosure by Gupta, S., Girshick, R., Arbelaez, P., Malik, J. in "Learning rich features from RGB-D images for object detection and segmentation" published in Fleet, D., Pajdla, T., Schiele, B., Tuytelaars, T., eds.: Proceedings of European Conference on Computer Vision, Volume 8695 of Lecture Notes in Computer Science., Zurich, Switzerland, Springer, pp. 345-360, 2014) that consists of three channels: (H) horizontal disparity, (H) height of the pixels above ground and (A) the angle between normals and the gravity vector based on the estimated ground floor, respectively. By using the HHA representation, which does not hold more information than a raw depth image, segmentation accuracy may improve. Whatever its encoding, the depth image does not depict reality as seen, and is thus not a visible image. Depth images can be acquired for instance using a sonar, or a stereoscopic device with two normal cameras. The term "depth camera" as used herein refers to the device for acquiring depth images.

As used herein, an image pair that includes one visible image and one depth image are corresponding images. That is, a pair of corresponding images is a pair of visible and depth images that depict different views of the same scene at the same moment (i.e., the visible image and the depth image are acquired at essentially the same time and from essentially the same view point). Generally, an RGB image and its corresponding depth image are referred to as an "RGB-D" image with four or more channels (e.g., four if RBG+depth value, and six if RGB+HHA). In the following disclosure, embodiments will be described using RGB-D images with HHA representation of depth.

Semantic segmentation of an input image, whether a visible image or a depth image, refers to the classification of each pixel of the input image (i.e., assigning a pixel of the input image a label that defines a type of an entity depicted by the pixel, where the label is selected among a predetermined set of labels). Once semantically segmented, an input image is partitioned into a plurality of labeled sets of pixels, where a "connected" set of pixels are neighboring pixels with the same label that depict an entity (i.e. a "real word" object). For example, pixels of an input image that depict a car are labelled as pixels having the class "car". An input image that is "semantically segmented" has pixels that are assigned a label from a predetermined set of labels (i.e., outputting a semantically segmented image).

As used herein, a depth completion image refers to both (i) a more complete representation of an input depth image, and (ii) an estimated depth image. In the case (i), the depth completion image is a more complete representation of an input depth image where gaps that may appear in the input depth image are closed. In the case (ii), the depth completion image is an estimated depth image as there is no corresponding input depth image. In either case (i) or (ii), the depth completion image is a depth image which has pixels that are assigned a depth value.

In accordance with the disclosed embodiments, the convolutional neural network (CNN) for semantic segmentation and depth completion in images is modular as it includes three subnetworks and it is multi-tasking as it is operable in a semantic segmentation setting (SS), and a depth completion setting (SS-D). In either the SS setting or SS-D setting, the CNN may operate when given any of these combinations of input (i) both a visible image and a depth image, (ii) only the visible image, or (iii) only a depth image.

A. System Architecture

FIG. 1 illustrates an example of a system architecture in which the method for semantic segmentation and depth completion in images is performed, by means of a first 10a and/or second server 10b. Each of these servers 10a and 10b is typically remote computer equipment that may be connected to an extended network 15 such as the Internet for data exchange. The first server 10a is the learning server (implementing the training method) and the second server 10b is a segmentation server (implementing the runtime method). In an alternate embodiment, these two servers may be merged.

The system architecture in FIG. 1 includes one or more items of client equipment 11, which may be any workstation 11c, robot 11d, or mobile device 11e (which may also be connected to network 15), preferably separate from the servers 10a, 10b but possibly being merged with one and/or the other thereof. Each server 10a, 10b and client equipment 11c, 11d, 11e comprises, respectively, data processing means 12a, 12b, 12c, 12d, 12e of processor type (in particular the data processing means 12a of the first server 10a have strong computing power, since learning is long and complex compared with ordinary use of the trained CNN), and optionally storage means 13a, 13b, 13c, 13d, 13e such as a computer memory (e.g. a hard disk).

The first server 10a stores or has access to one of more training set of image pairs 24. In the system architecture shown in FIG. 1, the training set of image pairs 24 are stored in memory 13a of the server 10a. Each image pair in each training set of image pairs 24, includes a visible image and a corresponding depth image, at least one of them being semantically segmented (i.e., include a set classified, or labeled data, as opposed to inputted data for which a classification is desired). In other words, pixels of at least one or both of the visible and depth image pair of each training set are labeled with a class label (i.e., semantically segmented).

Mathematically, the training set of image pairs 24 consists of N pairs $(x_i, d_i)_{i \in [[1;N]]}$ of images. Images in the training set of image pairs recorded with a corresponding width W and height H. In one embodiment, the image pairs of the training sets are recorded as 6-channels RGB-D (HHA) images, where depth images recorded in the HHA representation to have the same value range as RGB images, $x_i$, $d_i \in R^{H \times W \times 3}$. RGB images are annotated with $y_i \in L^{H \times W}$, where L is the label set, $L=\{1, \ldots, K\}$. In the case of depth completion, the ground truth values are assumed to be $d_i^* \in R^{H \times W}$ (note that $d_i^*$ may be set as $d_i$, in particular if HHA representation is not used). Data augmentation may be performed in the training set, by flipping and randomly rotating images on an angle between [−10, 10] degrees. RGB-D images that are augmented are selected randomly, but the augmentation is similar for both images of the pair (i.e., they will still correspond).

Once server 10a completes training of a CCN using the training set of image pairs 24, the trained CCN 200 is stored in memory 13b of server 10b. In operation, the client equipment 11 queries the server 10b with one or more data items (e.g., images) to be classified. The operators (i.e., "users") of the client equipment 11 are typically "clients" in the commercial meaning of the term, of the service provider operating the first and/or second servers 10a and 10b, respectively.

B. Learning Architecture

The present disclosure concerns a deep learning architecture that uses a "multi-view approach" for the tasks of semantic segmentation and depth completion. Using the multi-view approach, a unifying framework is adapted to process both tasks, where visible images and depth images are complementary sources of information about a visual scene. Unlike the fusion-based approaches described above, the multi-view approach uses a common representation between visible images and depth images.

The common representation has several advantages. A first advantage is that the common representation may be obtained using one view and then it may be used to reconstruct all views. That is, the multi-view approach may perform a task associated with a view that is unavailable (e.g., the task of depth completion when the depth image for the view is unavailable) due to technical or other reasons, thus increasing the robustness and fault-tolerance of the semantic segmentation and depth completion system. Having a single view of data at runtime enables the cross-view scenarios (i.e., from a depth image to segmentation view, and from an RGB image to a depth representation). Indeed, unlike semantic segmentation performed using the fusion-based approaches described above, when the visible image is unavailable in the multi-view approach, the depth view is used to obtain the common representation, which can then be used to perform the semantic segmentation task. In addition, when the depth view is unavailable in the multi-view approach, the RGB image is used to obtain the common representation, which can then be used to perform the depth completion task.

A second advantage is that the common representation is a central component of the semantic segmentation and depth completion system, which allows a common architecture to be used to perform both tasks. That is, when semantic segmentation is coupled with depth completion, mutual consistency is enforced between the views thereby enabling multi-tasking.

A third advantage is that the learning architecture is modular, thereby allowing a component to upgraded without changing all of the components of the system's training and optimization routines.

Figure 2A:
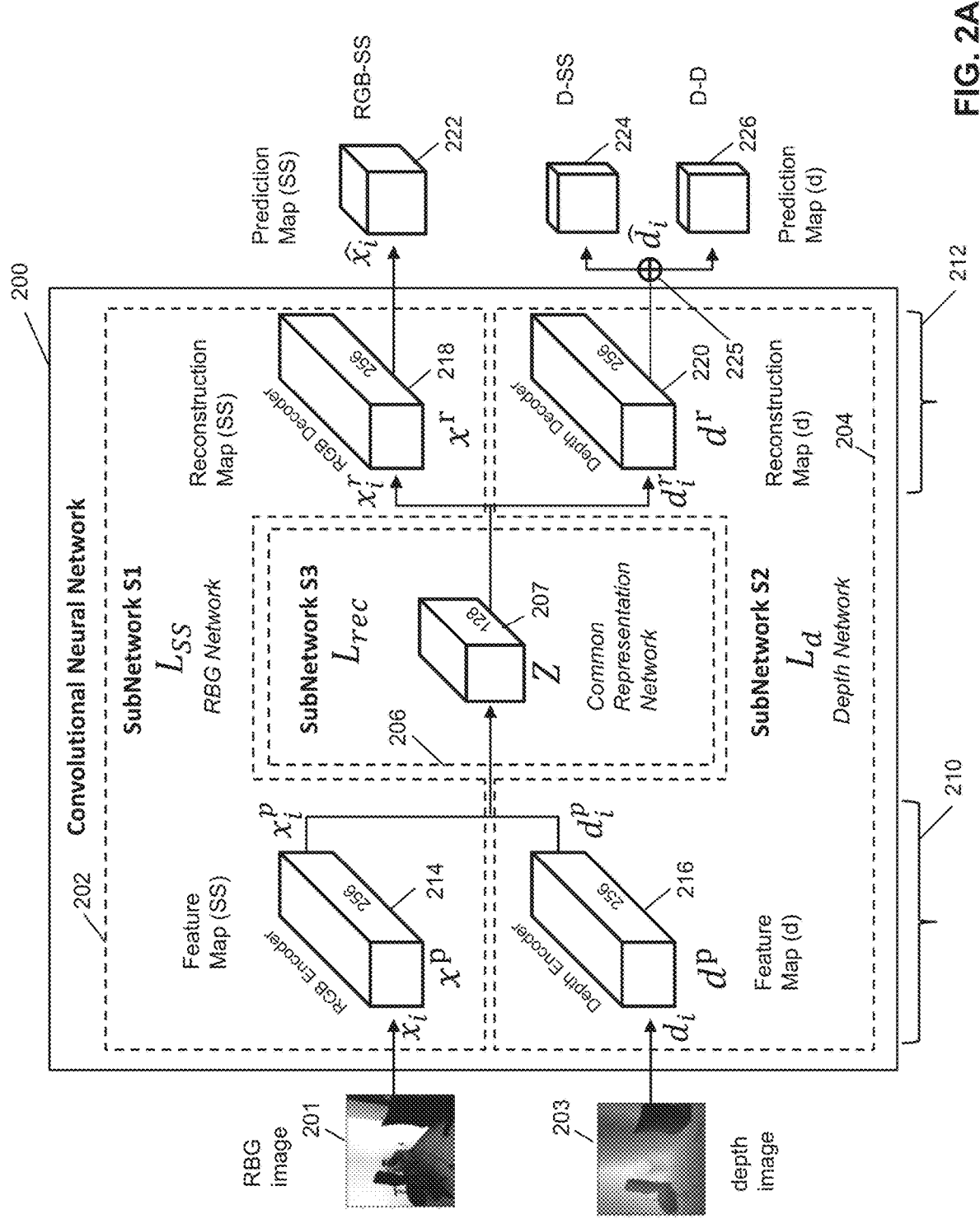

FIG. 2A illustrates an architecture of a convolutional neural network (CNN) 200 for the tasks of semantic segmentation and depth completion. The CNN 200 includes three subnetworks: (i) a first subnetwork S1 202, of the encoder-decoder type, dedicated to the modality "visible image" (or "RBG image"), and thus referred to as "RGB network"; (ii) a second subnetwork S2 204, again of the encoder-decoder type, dedicated to the modality "depth image", and thus referred to as "depth network"; and (iii) a third subnetwork S3 206, preferably of the autoencoder type, for commonly representing the modalities, and thus referred to as "common representation network".

The first subnetwork S1 202 and second subnetwork S2 204 have an encoder branch 210 (i.e., RGB Encoder 214 and Depth Encoder 216, respectively) and a decoder branch 212 (i.e., RGB Decoder 218 and Depth Decoder 220, respectively). The encoder branch 210 extracts a feature map from an inputted image, and the decoder branch 212 reconstructs an image (i.e., a predicted image) from a feature map.

More specifically, the decoder branch 212 up samples the feature map back to the original input resolution by semantically projecting low-resolution features learned by the encoders 214 and 216 onto the pixel high resolution space to output a dense, pixel-level classification. In particular, (i) the RGB Encoder 214 generates an outputted first feature map ($x_i^p$) from a visible image ($x_i$); (ii) the RGB Decoder 218 generates a semantically segmented image ($\hat{x}_i$) from an inputted first feature map ($x_i^r$); (iii) the Depth Encoder 216 generates an outputted second feature map ($d_i^p$) from a depth image ($d_i$); and (iv) the Depth Decoder 220 either generates a semantically segmented image or a depth image ($\hat{d}_i$) from an inputted second feature map ($d_i^r$).

Whether the Depth Decoder 220 generates a semantically segmented image or a depth image ($\hat{d}_i$) depends on whether the SS/SS-D setting 225 of the CNN 200 is enabled with the SS setting or the SS-D setting. In the SS setting of the CNN 200, the RGB Decoder 218 generates segmented image 222 (RGB-SS branch) and the Depth Decoder 220 generates segmented image 224 (D-SS branch). In the SS-D setting of the CNN 200, the RGB Decoder 218 generates a semantically segmented image 222 (RGB-SS branch) and the Depth Decoder 220 generates a depth completion image 226 (D-D branch).

Generally, the encoder branch 210 may include four convolution layers. More specifically, the encoder branch 210 has convolution layers which apply convolutions, and in particular "atrous" convolutions, at multiple scales to encode contextual information, while the decoder branch 212 refines the segmentation results along object boundaries. In one embodiment, the encoder-decoder architecture of the CCN 220 is implemented using the DeepLab network (see the publication by Chen, L., Papandreou, G., Kokkinos, I., Murphy, K., Yuille, A. L., entitled "DeepLab: Semantic Image Segmentation with Deep Convolutional Nets, Atrous Convolution, and Fully Connected CRFs", in IEEE Trans. Pattern Anal. Mach. Intell. 40(4) pp. 834-848, 2018). In alternate embodiments, other convolutional networks may be used in place of the "atrous" network to perform semantic segmentation such as a convolution network based on dilated convolution. An example implementation of dilated convolution is Fast FCN (see the publication by Huikai Wu et al., entitled "FastFCN: Rethinking Dilated Convolution in the Backbone for Semantic Segmentation", in arXiv preprint arXiv:1903.11816, 2019).

Figure 2B:
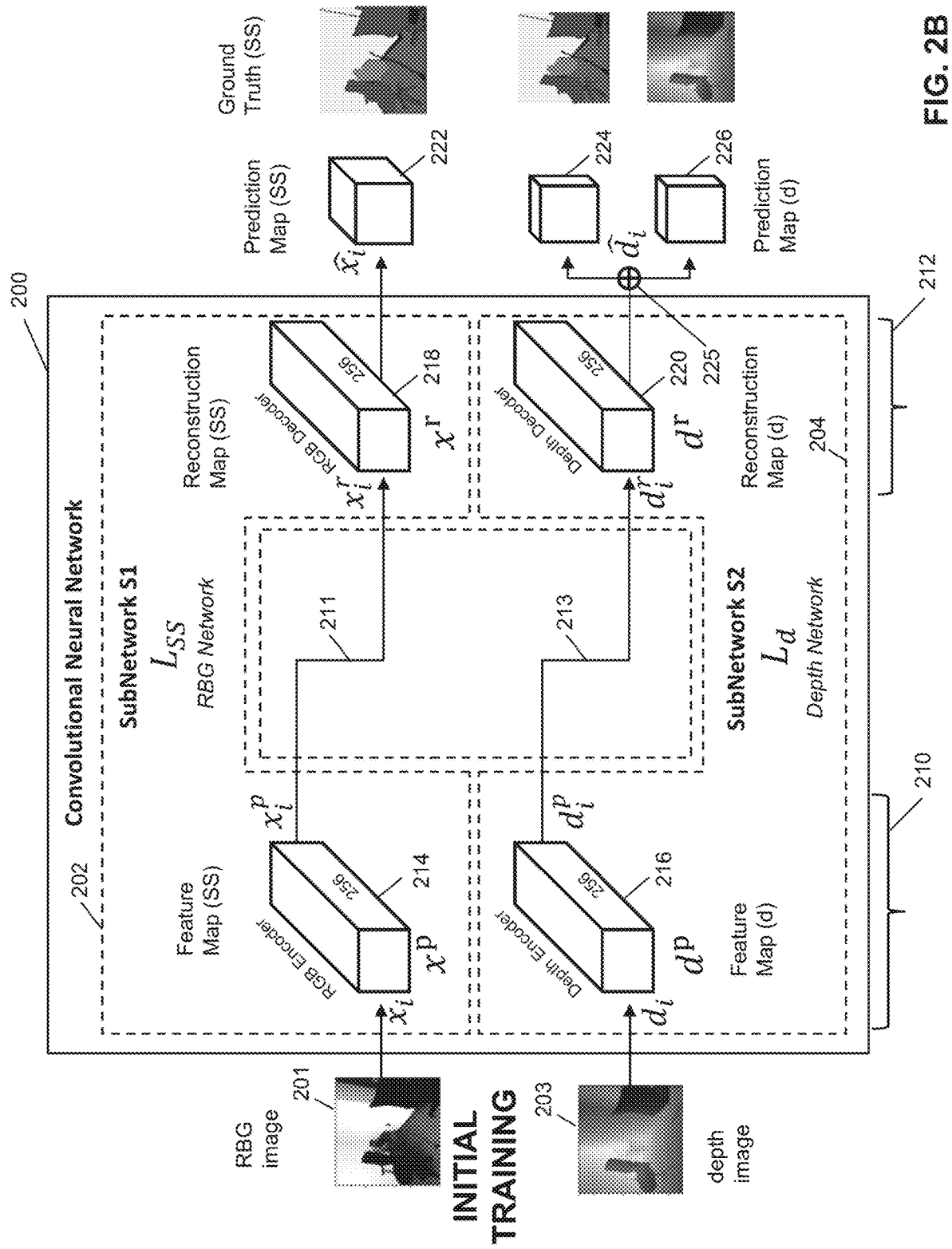

The encoder branch 210 may be initialized using the (dilated) Resnet 101 model trained on the COCO dataset. Initially during learning, the feature map inputted into the decoder branch 212 is the feature map outputted by the encoder branch 210 as shown in FIG. 2B. That is, the feature maps of the first subnetwork S1 202 and the second subnetwork S2 204 are transmitted from their encoders to their decoders, by bypassing the intermediate layer or the third subnetwork S3 206 (i.e., for the first subnetwork S1 202, the RGB Encoder 214 has direct connection 211 with the RGB Decoder 218, and for the second subnetwork S2 204, the Depth Encoder 216 has direct connection 213 with the Depth Decoder 220).

After training the first subnetwork S1 202 and the second subnetwork S2 204 as shown in FIG. 2B, the feature maps generated by the encoder branch 210 are fed to the third subnetwork S3 206 (i.e., the common representation network 207). Unlike fusion-based approaches, the common representation network 207 utilizes a multi-view autoencoder that enables the extraction of a common representation from either one or two views (i.e., from an RBG image and/or a depth image).

Accordingly, the third subnetwork S3 206 reconstructs the inputted first feature map ($x_i^r$) and the inputted second feature map ($d_i^r$) from the outputted first feature map ($x_i^p$) and the outputted second feature map ($d_i^p$). More specifically, the third subnetwork S3 206 generates the common representation network 207 from the outputted first feature map ($x_i^p$) and the outputted second feature map ($d_i^p$), and then generates the inputted first feature map ($x_i^r$) and the inputted second feature map ($d_i^r$) using the common representation network 207. Thus, the third subnetwork S3 206 is arranged between the encoder branch 210 and the decoder branch 212 of the first subnetwork S1 202 and the second subnetwork S2 204, thereby eliminating the direct connections 211 and 213 therebetween shown in FIG. 2B.

To summarize, after completing the initial training shown in FIG. 2B, each of the encoder branch 210 of the first subnetwork S1 202 and the second subnetwork 204, the decoder branch 212 of the first subnetwork S1 202 and the second subnetwork 204, are directly connected as inputs and outputs, respectively, to the third subnetwork S3 206. In other words, as shown in FIG. 2A, third subnetwork S3 206 links the encoders 214 and 216 and the decoders 218 and 220 of the first subnetwork S1 202 and the second subnetwork S2 204 (which were otherwise independent subnetworks when structures as set forth in FIG. 2B). Through the third subnetwork S3 206, RGB Encoder 214 of the first subnetwork S1 202 is connected to the RGB Decoder 218 of the first subnetwork S1 202 and the Depth Decoder 220 of the second subnetwork S2 204, and Depth Encoder 216 of the first subnetwork S2 204 is connected to the Depth Decoder 220 of the first subnetwork S1 202 and the Depth Decoder 220 of the second subnetwork S2 204.

Advantageously, the third subnetwork S3 206 is a multi-view autoencoder network, with at least one hidden layer. The inputs to the hidden layer of the third subnetwork S3 206 are the outputted feature map $x^p$ 214 and the outputted feature map $d^p$ 216 from the encoder branch 210. Similar to conventional autoencoders, the input and output layer of the auto encoder network have the same shape as the input, d×H'×W', whereas the hidden layer is shaped as k×H'× W', where k is frequently smaller than d. For example, in the embodiment shown in FIG. 2A k is 128 and d is 256.

Given a two-view input $z^p=(x^p, d^p)$, the hidden layer typically computes an encoded representation as the following convolution:

$$h(z^p)=h(\text{conv}(W_x,x^p)+\text{conv}(W_d,d^p)+b^p)$$

where $W_x$, $W_d$ are projection weights, $b^p$ is an input bias, and h is an activation function, for example, sigmoid or tan h.

A subsequent output layer tries to reconstruct $z^p$ from this hidden representation $h(z^p)$ by computing:

$$z^r=(x^r,d^r)=g([\text{conv}(V_x,h(z^p))+\text{conv}(V_d,h(z^p))]+b^r$$

where $V_x$, $V_d$ are reconstruction weights, $b^r$ is an output bias and g is an activation function.

C. Training Architecture

Figures 1, 2C:
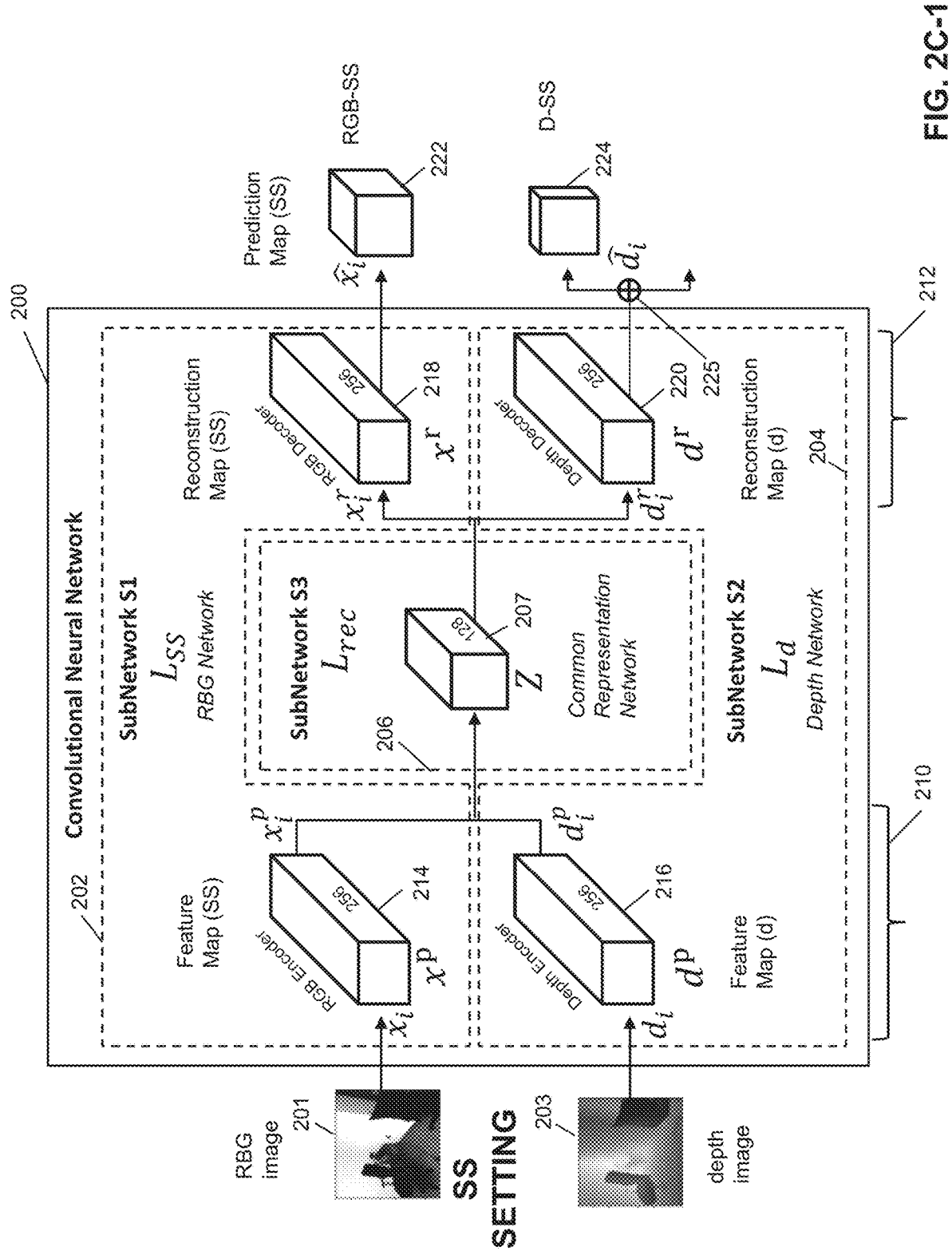
Figures 2, 2C:
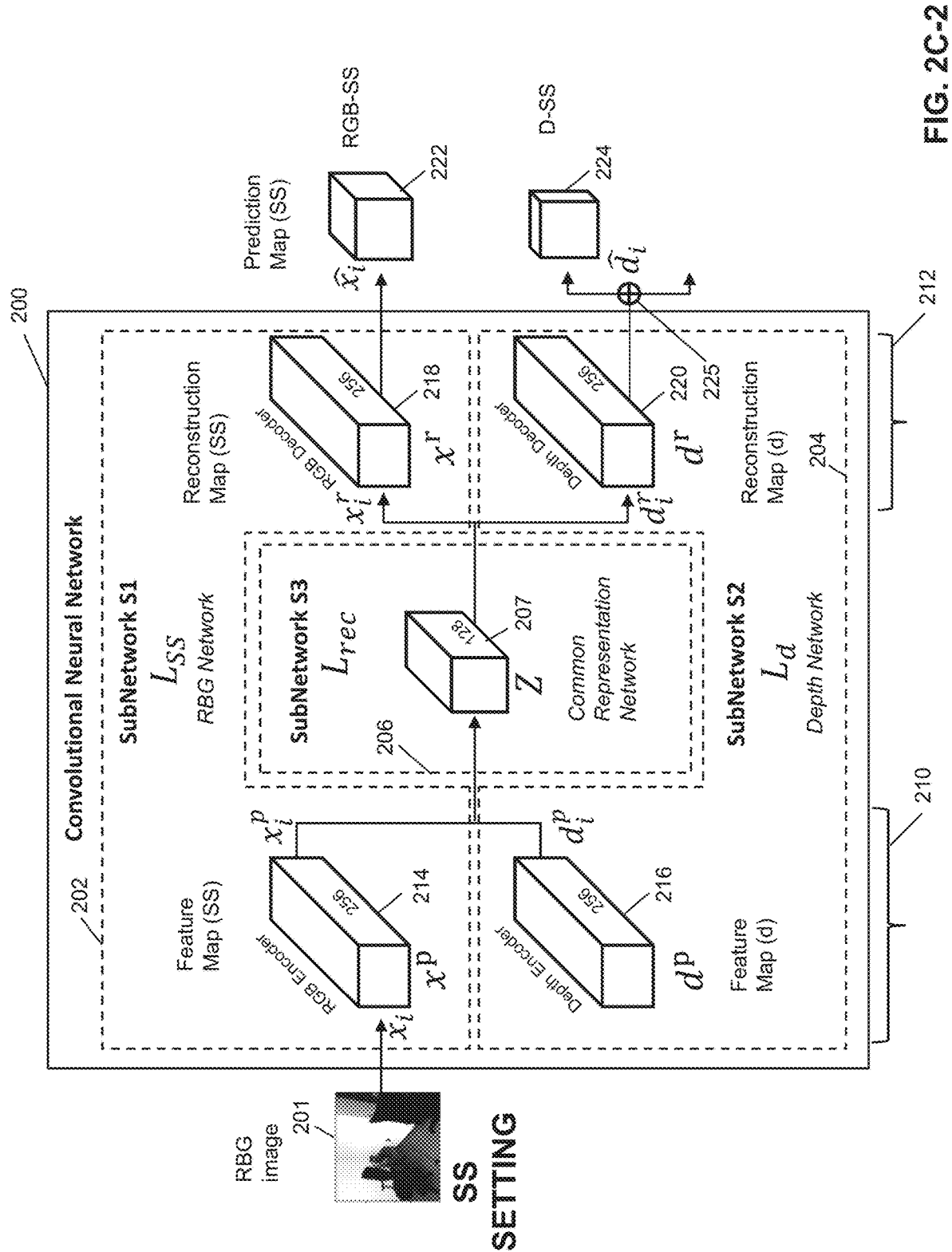
Figures 2, 2C, 3:
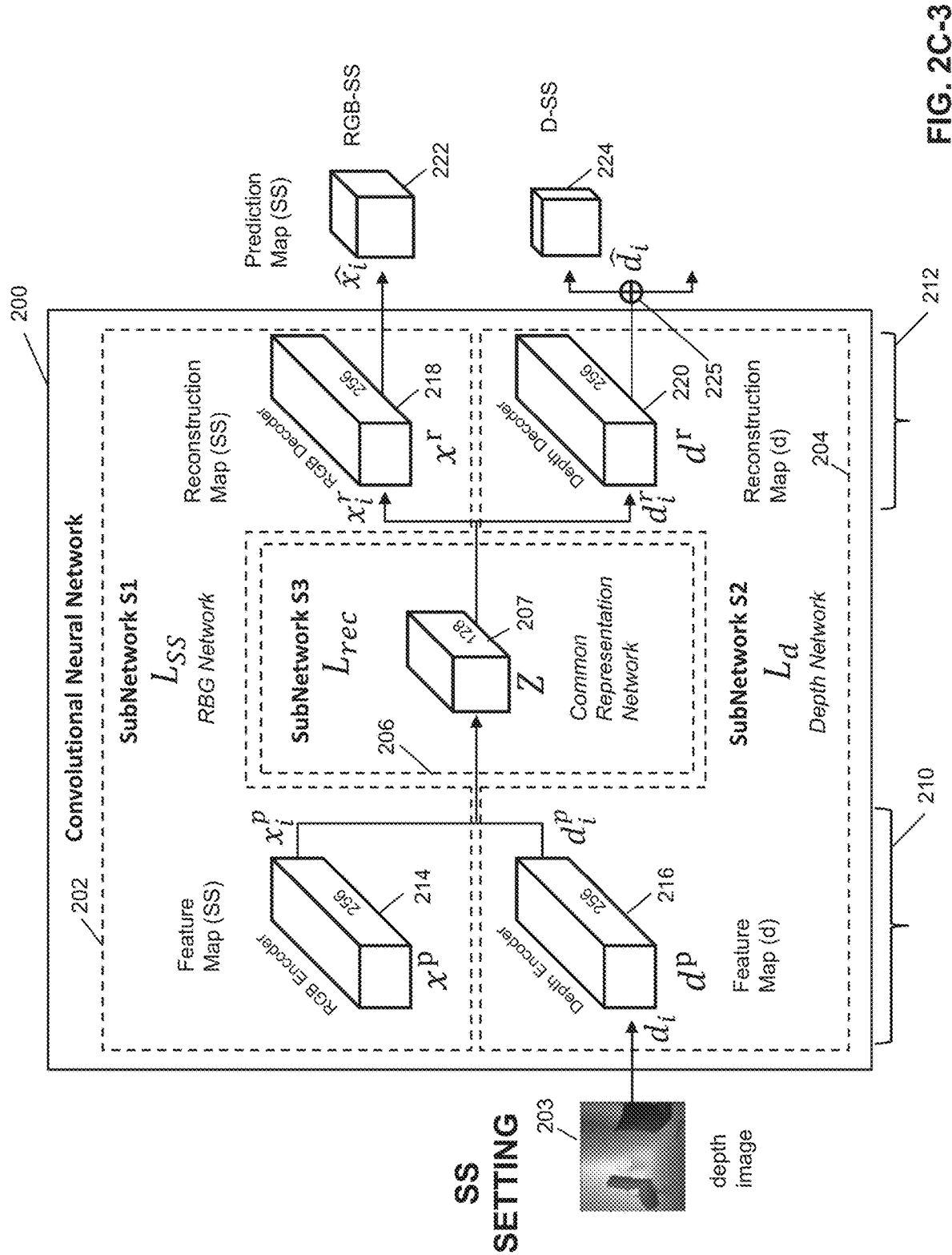

FIG. 3 sets forth a training method for training the convolutional neural network (CNN) 200 for semantic segmentation and/or depth completion of images. In one embodiment, the training method set forth in FIG. 3 may be performed by the data processing means 12a of the first server 10a shown in FIG. 1. At 302, the method accesses a training set of image pairs 24, which may be stored in memory 13a of the first server 10a, where each image pair in the training set of image pairs 24 includes a visible image ($x_i$) and a corresponding depth image ($d_i$), with at least one image in the pair of images being semantically segmented.

Generally, the first subnetwork S1 202 and second subnetwork S2 204 are trained at 304 and 306, respectively, using the training set of image pairs 24. With reference to FIG. 2B, the first subnetwork S1 202 and second subnetwork S2 204 are independently trained from each other (i.e., as though each were an independent network). Those skilled in the art will appreciate that some dependencies may exist.

At 304 (as shown in FIG. 2B), the inputted first reconstruction map $x_i^r$ is set equal to the outputted first feature map $x_i^p$ by the direct connection 211. More specifically at 304, the feature map ($x_i^p$) outputted by RGB Encoder 214 when applied to the visible image ($x_i$) of a training pair is given by $x_i^p = g^V(x_i, \theta^V)$, $x_i^p \in \mathbb{R}^{d \times H' \times W'}$ where $\theta^V$ are learnt parameters of the first subnetwork S1 202 that receives as input visible (RBG) images 201.

At 306 (as shown in FIG. 2B), the second reconstruction map $d_i^r$ is set equal to the outputted second feature map $d_i^p$ by the direct connection 213. More specifically at 306, the feature map ($d_i^p$) outputted by the depth encoder 216 when applied to the depth image ($d_i$) of the same training pair is given by $d_i^p = g^D(d_i, \theta^D)$, $d_i^p \in \mathbb{R}^{d \times H' \times W'}$, where $\theta^D$ are learnt parameters of second subnetwork S2 204 that receives as input depth images 203.

In training the first subnetwork S1 202 at 304 and second subnetwork S2 204 at 306, a first loss function $L_{SS}$ and a second loss function $L_d$ are, respectively, minimized over the training set of image pairs 24. In one embodiment, a randomly initialized softmax classification layer may be placed as an additional layer after the layers $g^V$ and $g^D$. The first subnetwork S1 202 and second subnetwork S2 204 are trained using stochastic gradient descent on mini-batches of visible images and depth images in the training set of image pairs 24. After the convergence, all parameters $\theta^V$ and $\theta^D$ learnt of the first subnetwork S1 202 and second subnetwork S2 204, respectively, are retained for the next training stage at 308, wherein the third subnetwork S3 206 will be used. The second subnetwork S2 204 is trained at 306 in the SS setting and the SS-D setting.

In one embodiment when training first subnetwork S1 202, the first loss function $L_{SS}$ is a semantic loss function $L_V^{SS}$, defined as the cross-entropy loss:

$$L_V^{SS} = -\sum_{i=1}^{N} P(y_i | \hat{x}_i)$$

where $\hat{x}_i$ is a pixel-wise prediction for visible image $x_i$, $y_i$ is the ground truth label, $P(y|x) = \Sigma_j \log p(y_j|x_j)$, and $p(y_j|x_j)$ is the probability of estimation of the semantic label $y_j$ at pixel j.

When training second subnetwork S2 204 in the SS setting, the training procedure (e.g., loss, parameters, etc.) of the second subnetwork S2 204 is similar to first subnetwork S1 202, and the second loss function is also preferably a semantic loss function $L_D^{SS}$, defined as the cross-entropy loss:

$$L_D^{SS} = -\sum_{i=1}^{N} P(y_i | \hat{d}_i)$$

where $\hat{d}_i$ is a pixel-wise prediction for depth image $d_i$, and $y_i$ is the ground truth semantic label.

When training in the SS-D setting, the decoder branch of the second subnetwork S2 204 estimates depth, so that the second loss function is a regression loss function $L_D^D$ on the training depth data:

$$L_D^D = -\sum_{i=1}^{N} S(d_i^*, \hat{d}_i)$$

where $S(d_i^*, \hat{d}_i)$ measures the difference between the ground truth $d_i^*$ and depth prediction $\hat{d}_i$. The function S in one embodiment is the scale-invariant loss (as described by Eigen, D., Puhrsch, C., Fergus, R., in the publication entitled "Depth map prediction from a single image using a multi-scale deep network", published in Proceedings of the 27th International Conference on Neural Information Processing Systems—Volume 2. NIPS'14, Cambridge, Mass., USA, MIT Press, pp. 2366-2374, 2014), where the function S measures the relationships between points in the image irrespective of the absolute values, but also the standard L2 and Huber loss. Less sensitive to outliers than the L2 loss, Huber loss is defined as:

$$L_1^{smo}(d_i^*, d_i^r) = \sum_j \alpha(d_{ij}^* - d_{ij}^r), \text{ where}$$

$$\alpha(x) = \begin{cases} 0.5x^2, & \text{if } |x| < 1 \\ |x| - 0.5, & \text{otherwise} \end{cases}.$$

The training architecture has been implemented on the PyTorch framework. Both encoders may be initiated with the dilated ResNet101 model pretrained on the COCO dataset. In one formation, the first subnetwork S1 202 and second subnetwork S2 204 are trained for 20,000 iterations using stochastic gradient descent with momentum 0.9, batch size 18, and minimizing modality losses, $L_V^{SS}$ and $L_D^{SS}/L_D^D$. A weight decay of 0.0005 and the polynomial decay for the learning rate, with the base Learning Rate 0.00025 and power 0.9 may be applied.

At 308, the CNN 200 is trained by integrating the third subnetwork S3 206 with the first subnetwork S1 202 trained at 304 and second subnetwork S2 204 trained at 306. In other words, at 308 training of the CNN 200 is performed as a whole over the first subnetwork S1 202, second subnetwork S2 204 and third subnetwork S3 206 using the training set of image pairs 24, wherein the third subnetwork S3 206 of the CNN is trained to reconstruct (i) the inputted first feature map ($x_i^r$) from the outputted first feature map ($x_i^p$) and (ii) the inputted second feature map ($d_i^r$) from the outputted second feature map ($d_i^p$). As shown in FIG. 2A, the third subnetwork S3 206 is arranged between the encoder branch 210 and the decoder branch 212 of the first subnetwork S1 202 and the second subnetwork S2 204, instead of the direct connection shown in FIG. 2B between the encoder branch 210 and the decoder branch 212 in each of the first subnetwork S1 202 and second subnetwork S2 204. In other words, the inputted first feature map $x_i^r$ is no longer set (through direct connection 211) to equal the outputted first feature map $x_i^p$, and the inputted second feature map $d_i^r$ is no longer set (through direct connection 213) to equal the outputted second feature map $d_i^p$.

Advantageously, the common representation of the third subnetwork S3 206 outputs reconstructed feature maps x$^r$ for visible images as f(g(x$^p$)) and reconstructed feature maps d$^r$ for depth images as f(g(d$^p$)). The entire set of network parameters is θ={θ$^V$, θ$^D$, θ$^R$}, wherein in particular θ$^R$={W$_x$, W$_d$, V$_x$, V$_d$, b$_p$, b$_r$}.

The CNN 200 as a whole is trained at 308 by minimizing a weighted sum of the first loss function L$_V^{SS}$, the second loss function L$_D$ and a third loss function L$_{rec}$. This objective function to minimize may then be defined as:

$$L = L_V^{SS} + L_D + \lambda L_{rec}$$

where the second loss function L$_D$ is either L$_D^{SS}$ in the SS setting or L$_D^D$ in the SS-D setting; λ is a scaling parameter for the reconstruction loss. In the above formulation, the semantic, depth and reconstruction losses are optimized jointly.

Given data $\{(x_i^p, d_i^p)\}_{i \in [[1;N]]}$ from the encoder branch 210, the third subnetwork S3 206 is designed to minimize: (i) the self-reconstruction errors by minimizing the error in reconstructing the first feature map x$_i^p$ (obtaining x$_i^r$) from the first feature map x$_i^p$ and the second feature map d$_i^p$ (obtaining d$_i^r$) from the second feature map d$_i^p$, and (ii) the cross-reconstruction errors by minimizing the error in reconstructing the first feature map d$_i^p$ (obtaining x$_i^r$) from the second feature map d$_i^p$ and the second feature map d$_i^p$ (obtaining x$_i^r$) from the first feature map x$_i^p$.

The reconstruction loss L$_{rec}$ may therefore be defined as:

$$L_{rec} = \sum_{i=1}^{N} (L_r(z_i, g(h(z_i))) + L_r(z_i, g(h(x_i^p))) + L_r(z_i, g(h(d_i^p))))$$

where L$_r$ is the reconstruction error L$_r$(x,x')=||x−x'||$^2$, and where h(x$_i$) and h(d$_i$) respectively denote the representations h(x$_i$, 0) and h(0, d$_i$) that are based only on a single view. For each instance with two modalities x and d, h(x$_i$) refers to computing the hidden representation using only the x-view. In other words, in the equation for h(x$_i^p$), setting d$_i^p$=0 results in h(x$_i^p$)=h(conv(W$_x$,x$_i^p$)+b$^p$). Similarly, h(x$_i^p$)=h (conv(W$_d$,d$_i^p$)+b$^p$).

In the reconstruction loss L$_{rec}$, the first term is the usual autoencoder objective function which helps in learning meaningful hidden representations. The second term ensures that both views can be predicted from the common representation of the first view alone. The third term ensures that both views can be predicted from the common representation of the second view alone.

Alternatively, a possibility is maximizing the view correlation, as proposed for example in the publication by Chandar, A. P. S., Khapra, M. M., Larochelle, H., Ravindran, B., entitled "Correlational neural networks", published in Neural Computation 28 2:257-85, 2016. In such a case, the correlation between the hidden representations of the two views is maximized. The correlation term may be included in the total objective function L, by interacting with the other terms; it makes sure that the hidden representations of the two views are highly correlated.

In one embodiment, learning starts at 308 with the first and second subnetworks parameters θ$^V$ and θ$^D$ learnt at 304 and 306, respectively, and they are refined as well as the third subnetwork S3 206 parameters θ$^R$ by minimizing the objective function L.

The CNN 200 may be fine-tuned with the Adam optimizer, and by keeping parameters θ$^V$ and θ$^D$ unchanged, it allows the training to speed-up without performance loss.

It is to be noted that the parameters θ$^V$ and θ$^D$ learnt at 304 and 306, respectively, may remain unchanged while learning at 308.

D. Runtime

Figure 4:
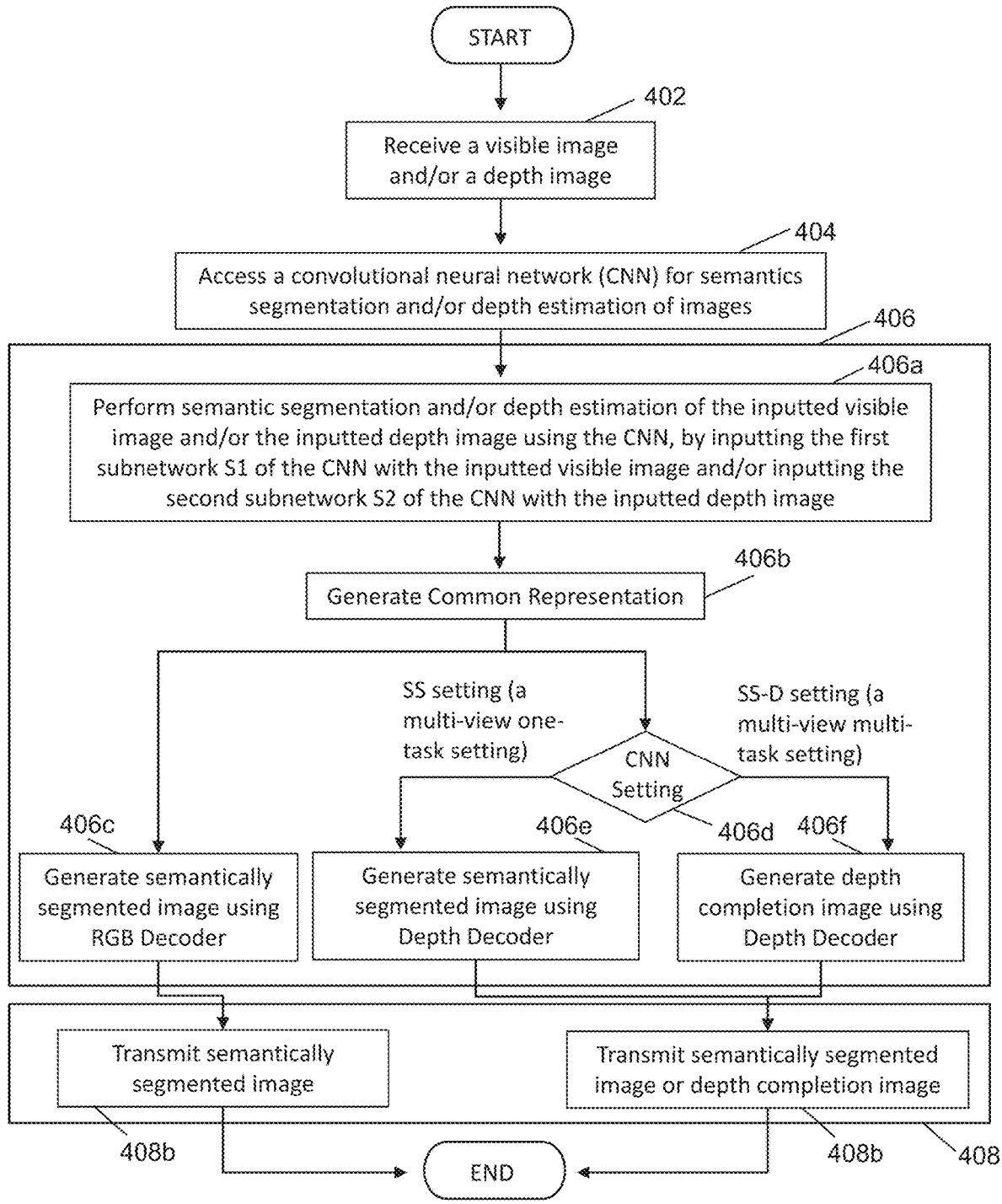
FIG. 4 sets forth a runtime method for using a convolutional neural network trained using the method shown in FIG. 3.

FIG. 4 sets forth a runtime method for performing semantic segmentation and/or depth completion with a convolutional neural network (CNN) 200.

At 402, a visible image and/or a depth image is received (which in one embodiment are/is received from client equipment 10 shown in FIG. 1).

At 404, a CNN 200 trained in accordance with the method shown in FIG. 3 (i.e., initially the first subnetwork S1 202 and second subnetwork S2 204 are independently trained, and then the first subnetwork S1 202, second subnetwork S2 204 and third subnetwork S3 206 are trained together) is accessed (which in one embodiment is from memory 13b of the second server 10b, in an alternate embodiment the first server 10a and the second server 10b are the same equipment, thereby sharing memory 13a and 13b).

At 406, semantic segmentation and/or depth analysis is performed using the CNN 200 accessed at 404 on the visible and/or depth image received at 402 (which in one embodiment is performed by the processing means 12b of the second server 10b shown in FIG. 1). At 406a depending on the images received at 402, the first subnetwork S1 202 of the CNN 200 is input with the visible image 201 and/or the second subnetwork S2 204 of the CNN 200 is input with the depth image 203. At 406b, the third subnetwork S3 206 computes a common representation. Advantageously as a result of the common representation computed at 406b, the CNN 200 operates at 406c (using the RGB Decoder 218) and at 406d (using the Depth Decoder 220) whether one or both of the visible image 201 and the depth image 203 are received at 402. It will be appreciated that improved performance is achieved if both the visible image 201 and the depth image 203 are received at 402.

From the common representation computed at 406b, outputted first feature map (x$_i^p$) is processed at 406c by the RGB Decoder 218 of the first subnetwork S1 202 to generate a semantically segmented image (RGB-SS branch). In addition, depending on whether the SS/SS-D setting 225 of the CNN 200 is enabled at 406b with the SS setting or the SS-D setting, the method performs either 406e or 406f, respectively. More specifically at 406d, from the common representation computed at 406b, outputted second feature map (d$_i^p$) is processed by the Depth Decoder 220 of the second subnetwork S2 204 either at 406e to generate a semantically segmented image (D-SS branch) or at 406f to generate a depth completion image (D-D branch). At 408, the outputted images from 406c and either 406e or 406f are transmitted (which in one embodiment is to the client equipment 10 shown in FIG. 1 from which the visible image and/or the depth image are received at 402). In an alternate embodiment, the semantically segmented images 222 and 224 may be merged at 408 before transmission.

When the CNN 200 is enabled with the SS setting at 406d (as shown in FIG. 2C), the decoder branch 212 of the second subnetwork S2 204 (i.e., the Depth Decoder 220) generates at 406e a semantically segmented image 224 from an inputted second feature map (d$_i^p$). The resulting output of the CNN 200 at 406c includes a first semantically segmented image 222 at the output of the first subnetwork S1 202 and a second semantically segmented image 224 at the output of the second subnetwork S2 204, regardless of whether at 402 (i) a visible image 201 and a depth image 203 is received (as shown in FIG. 2C-1), (ii) only a visible image 201 is received (as shown in FIG. 2C-2), or (iii) only a depth image 203 is received (as shown in FIG. 2C-3). In effect, the SS setting is a multi-view one-task setting.

Figures 1, 2D:
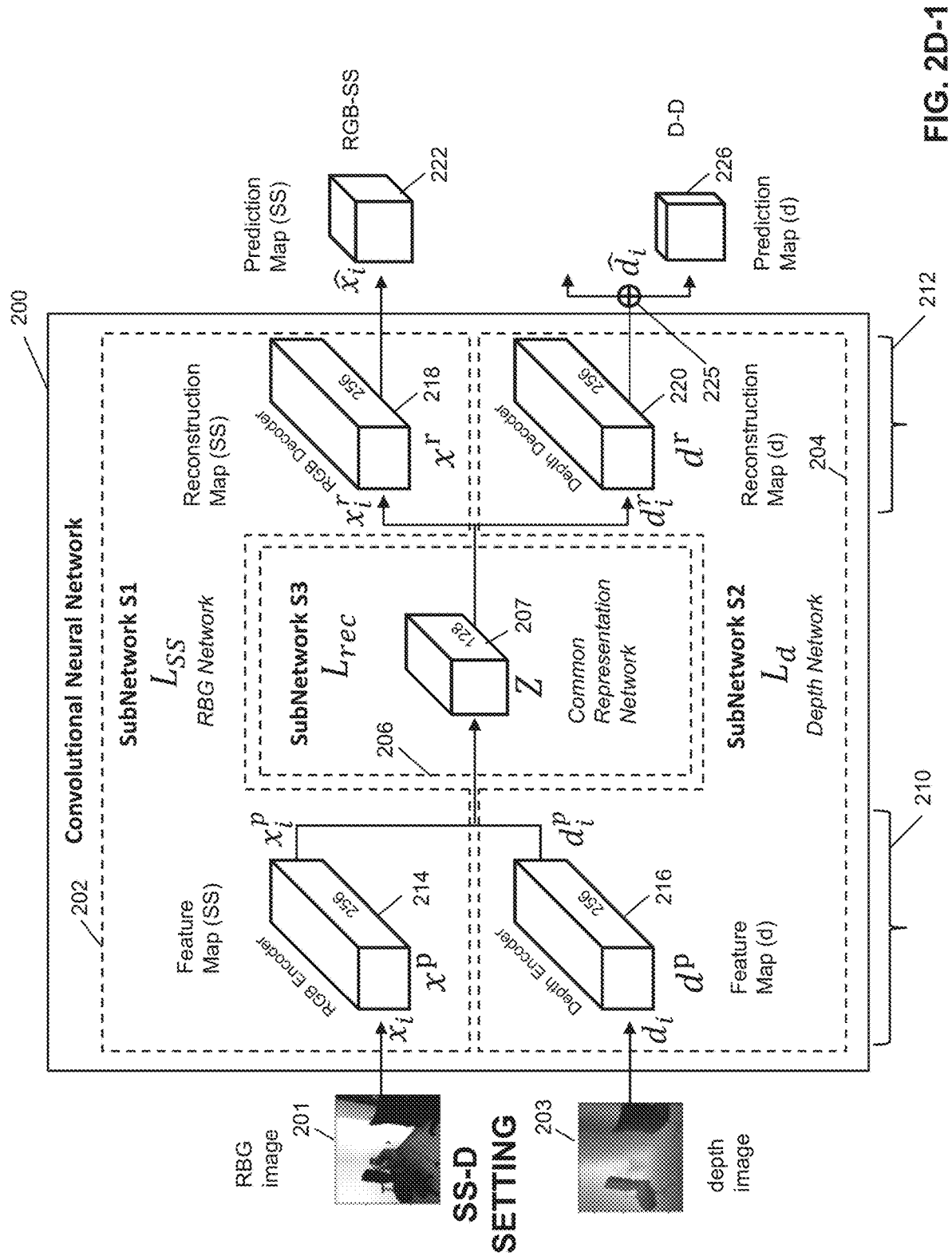
Figures 2, 2D:
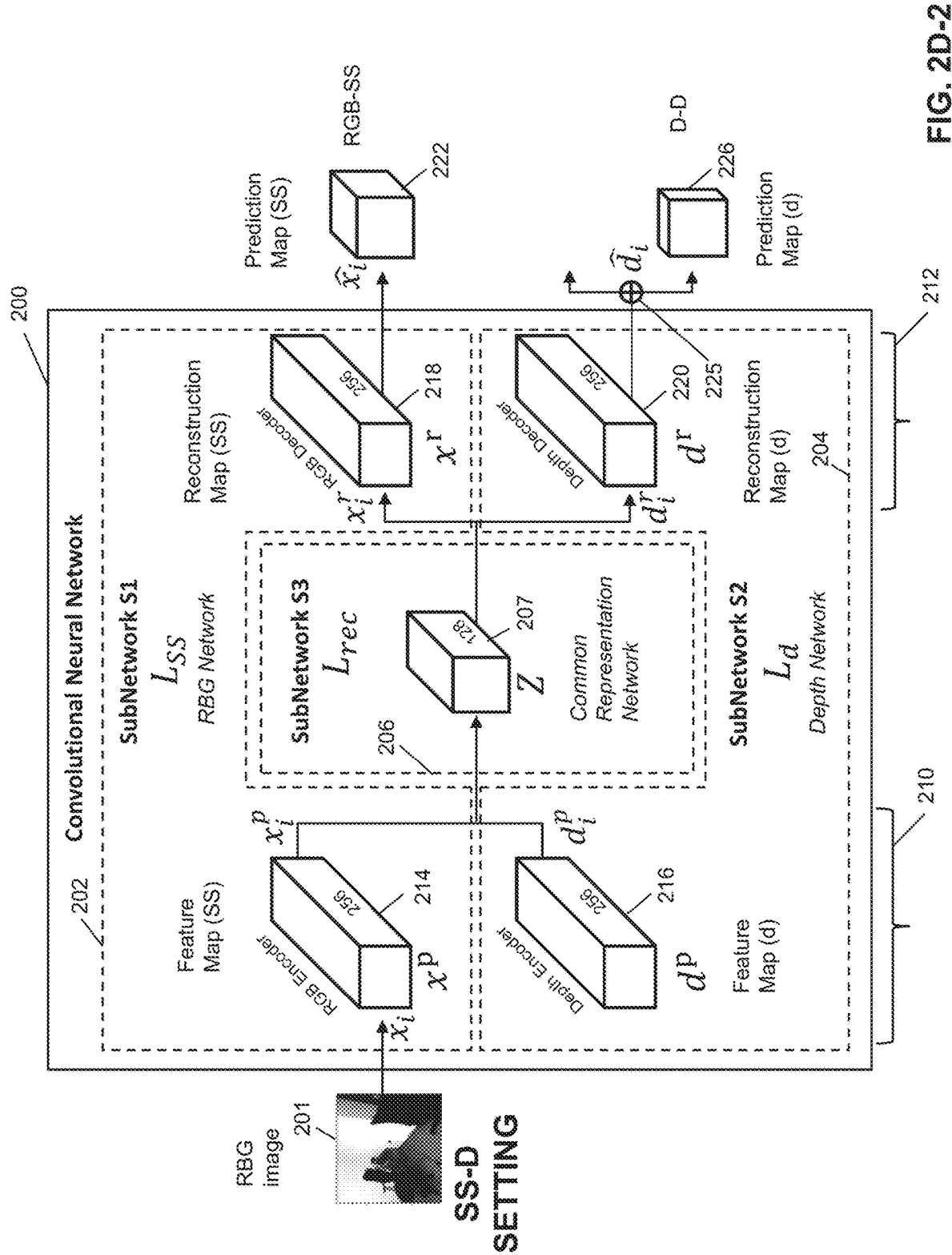
Figures 2, 2D, 3:
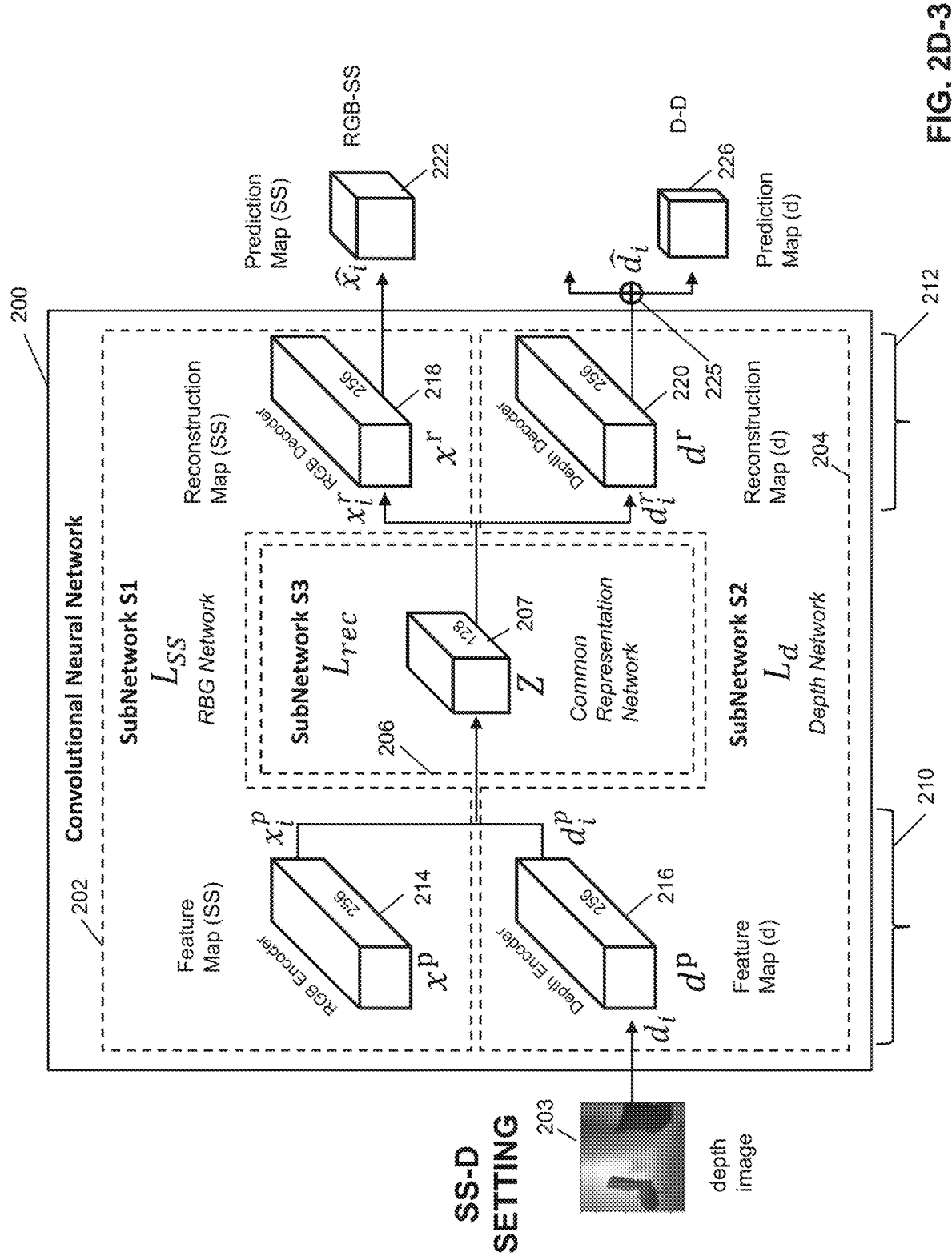
Figure 3:
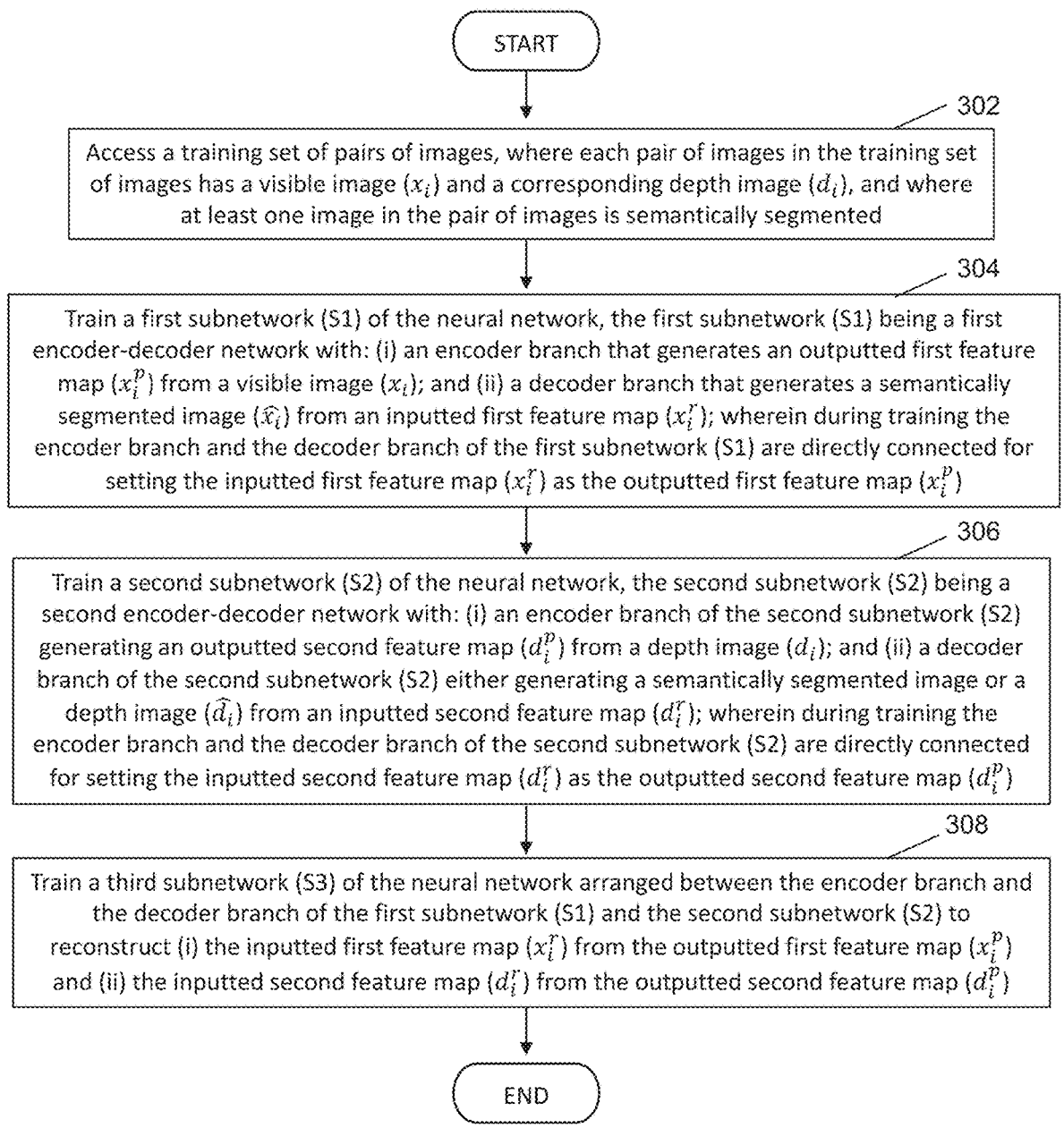

When the CNN 200 is enabled with the SS-D setting at 406d (as shown in FIG. 2D), the decoder branch 212 of the second subnetwork S2 204 (i.e., the Depth Decoder 220) generates at 406f a depth completion image 226 (D-D branch) from an inputted second feature map ($d_i^p$). The resulting output of the CNN 200 at 406c is a semantically segmented image 222 at the output of the first subnetwork S1 202, and a depth completion image 226 at the output of the second subnetwork S2 204, regardless of whether at 402 (i) a visible image 201 and a depth image 203 is received (as shown in FIG. 2D-1), (ii) only a visible image 201 is received (as shown in FIG. 2D-2), or (iii) only a depth image 203 is received (as shown in FIG. 2D-3). In effect, the SS-D setting is a multi-view, multi-task setting.

Figure 5A:
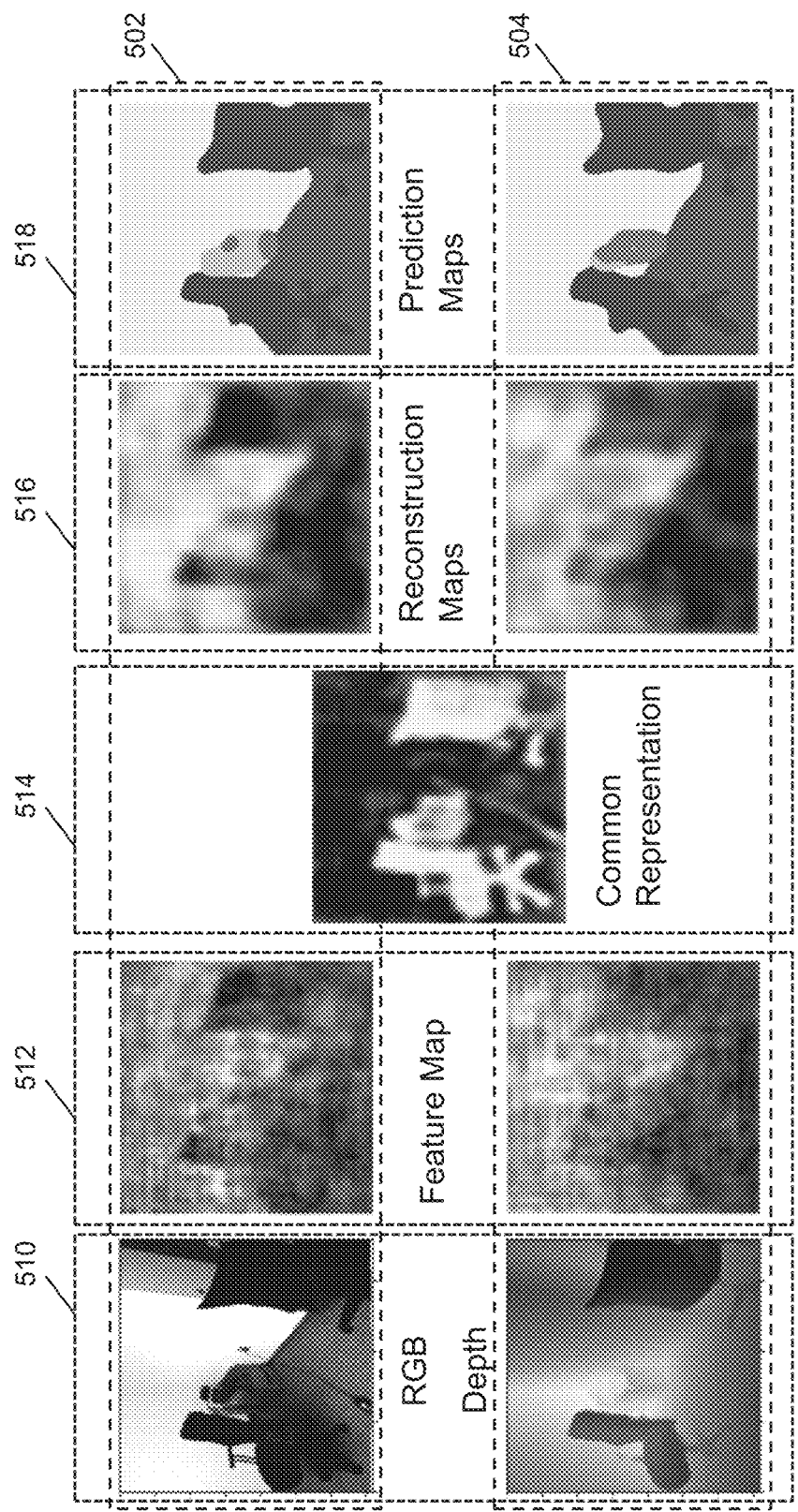
FIGS. 5A and 5B show two examples of processing visible image and/or depth images at different layers of the convolutional neural network architecture.
Figure 5B:
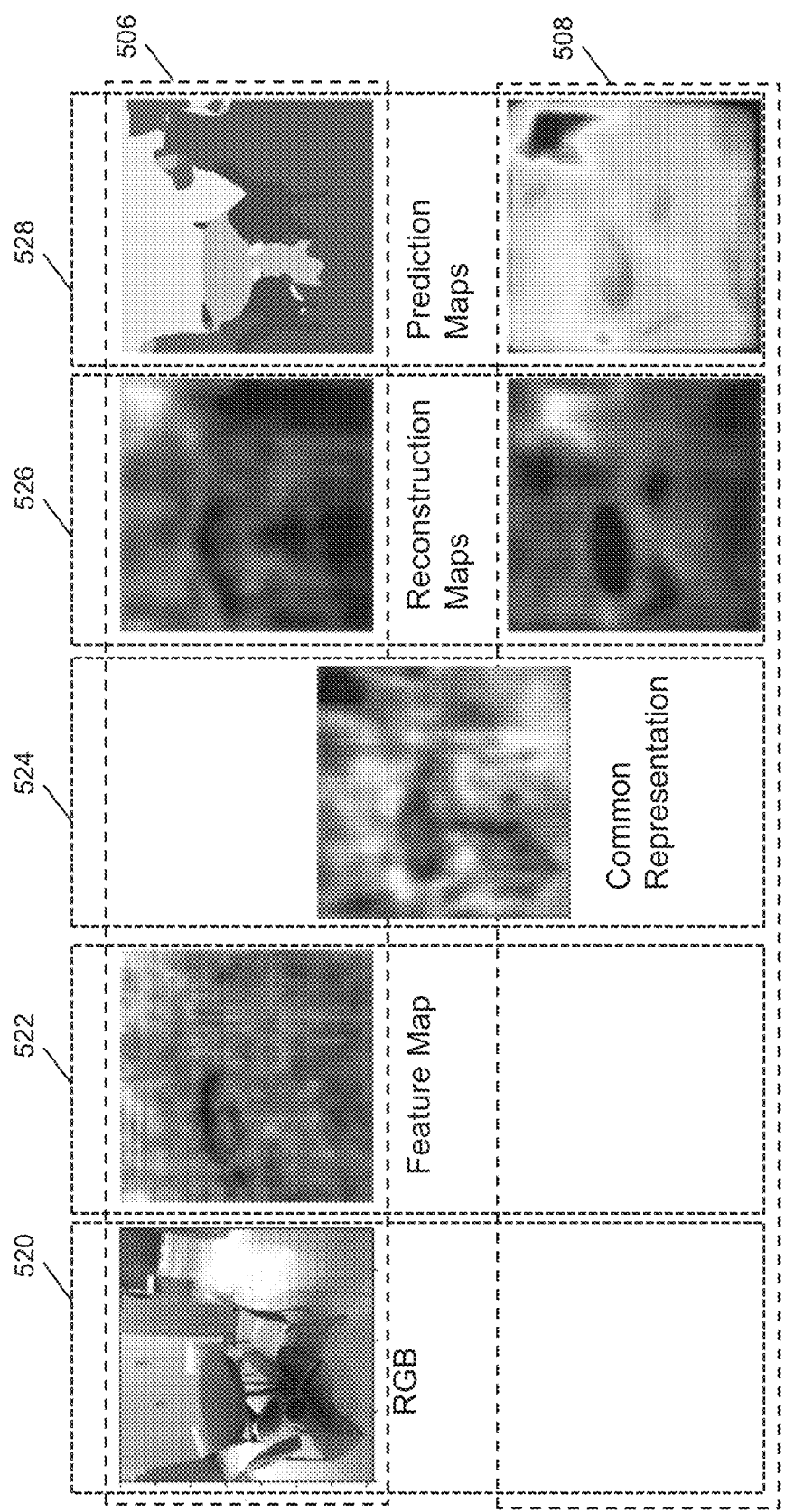

FIGS. 5A and 5B show two examples of processing a visible image and/or a depth image at different layers of the convolutional neural network architecture shown in FIG. 2. In the example of FIG. 5A, the CNN 200 is in SS setting and is inputted with both the visible image 201 (as shown generally in FIG. 2C-1) at row/column square 502/510 and the corresponding depth image 203 at row/column square 504/510. As a result, semantically segmented image 222 is output at row/column square 504/518 and semantically segmented image 224 is output at row/column square 506/518.

In the example of FIG. 5B, the CNN 200 is in SS-D setting and is inputted with only the visible image 203 (as shown generally in FIG. 2D-2) at row/column square 506/520. Advantageously when in the SS-D setting, though only the visible image 203 is inputted, the CNN 200 produces as output a semantically segmented image 222 and a depth completion image 226 (D-D branch). As shown in FIG. 5B, the feature map at row/column square 506/522 constructed from RGB network leads to the common representation at column square 524, which yields reconstruction maps at row/column squares 506/526 and 508/526 and prediction maps at row/column squares 506/528 and 508/528 for the semantically segmented image 222 and the depth completion image 226, respectively.

More specifically, in FIGS. 5A and 5B, respectively: (i) rows 502 and 506 corresponds to the stream for a visible image (where the first subnetwork S1 202 is utilized); (ii) rows 504 and 508 corresponds to the stream for a depth image (where the second subnetwork S2 204 is utilized); (iii) at row/column squares 502/510 and 506/520 is an inputted visible image x; (iv) at row/column squares 504/510 and 508/520 is an inputted depth image d (if any); (v) at row/column squares 502/512 and 506/522 is an outputted first feature map $x^p$ (if any) (inputted to the third subnetwork S3 206); (vi) at row/column squares 504/512 and 508/522 is an outputted second feature map $d^p$ (if any) (inputted to the third subnetwork S3 206); (vii) at column squares 514 and 524 is a common representation from the third subnetwork S3 206 (which common representation is the same for both streams); (viii) at row/column squares 502/516 and 506/526 the inputted first feature map $x^r$ (i.e., the reconstruction $x_i^r$ output by the third subnetwork S3 206); (ix) at row/column squares 504/516 and 508/526 the inputted second feature map $d^r$ (i.e., reconstruction $d_i^r$ output by the third subnetwork S3 206); (x) at row/column squares 502/518 and 506/528 the outputted segmented image image $\hat{x}$ output by the first subnetwork S1 202; (xi) at row/column squares 504/518 the outputted segmented image $\hat{d}$ output by the second subnetwork S2 204 when in the SS setting; (xii) at row/column squares 508/528 the outputted depth image $\hat{d}$ output by the second subnetwork S2 204 when in the SS-D setting.

E. Performance

Two common criteria that are used to evaluate a neural network's performance of a segmentation task are the pixel accuracy and the intersection-over-union (IoU) score. If $C_{ij}$ denotes the number of pixels predicted as class j but actually belongs to class i, where i,j∈L are in the label set L, then $C_{ii}$ denotes the number of pixels with correct prediction of class i. If $T_i$ denotes the total number of pixels that belongs to class i in the ground truth, and K is the total number of classes in the dataset, then: (i) pixel accuracy (Acc) measures the percentage of correctly classified pixels:

$$Acc = \frac{\sum_i C_{ii}}{\sum_i T_i}$$

(ii) intersection-over-union (IoU) calculates the average value of the intersection between the ground truth and the predictions:

$$IoU = \frac{1}{K} \sum_i \frac{C_{ii}}{T_t + \sum_j C_{ji} - C_{ii}}.$$

Pixel accuracy is known for being sensitive to class disbalance, which is when many images include large objects such as beds, walls, floors, etc. Also, the accuracy value may be misleading when the neural network performs better on the large objects and worse on the small ones. In contrast, IoU score remains informative on both balanced and unbalanced datasets.

For depth completion, the root mean square error (RMSE) measures the error between the estimated depth and ground truth may be used.

Table 1 below (which sets forth independent and joint learning with one or two views at test time) reports IoU values depending on the SS/SS-D setting 225 of the CNN 200 on one evaluation using the NYU2 dataset.

In the SS setting, training two modality branches of the first subnetwork S1 202 and second subnetwork S2 204 independently yields 53.1 (RGB) and 37.1 (depth) IoU values; this reflects the RGB view being more informative than the depth view. Using the common representation of the CNN 200 at runtime is shown to improve the performance in cases when the depth view or both views are available. As both the image and depth views of the CNN 200 may address the segmentation task, the common representation makes performance dependent on which views are available at runtime; it does not depend which view is being reconstructed.

In the SS-D setting, the baseline for RGB-SS branch (as shown in FIG. 2A) is the same as in the SS setting, the baseline for depth reconstruction using D-D branch yields an RMSE value of 0.51. The common representation improves the RGB value to 54.3, and reduces the reconstruction error to 0.39 and 0.53 when using the depth view only or both views, respectively. In the cross-view reconstruction, using the depth view for segmentation drops IoU value to 35.0 only, using RGB view for depth completion yields 0.72 error.

TABLE 1

| Setting | Branch | Independent | | Common Representation | | |
|---|---|---|---|---|---|---|
| | | RBG | Depth | RBG | Depth | RGB + D |
| SS | RGB-SS | 53.1 | — | 51.1 | 41.2 | 57.6 |
| | D-SS | — | 37.1 | 51.2 | 41.1 | 57.7 |
| SS-D | RGB-SS | 53.1 | — | 54.3 | 35.0 | 55.2 |
| | D-D | — | 0.51 | 0.72 | 0.39 | 0.53 |

F. General

The above disclosed methods may be implemented in code and form part of a computer program product that executes methods (e.g., the data processing means 12 of the first server 10a or the data processing means 12b of the second server 10b) stored in memory (e.g., memory means 13 of the first server 10a or second server 10b) at training time, for training a convolutional neural network (CNN) or at runtime, for performing semantic segmentation and/or depth completion of an inputted visible image and/or an inputted depth image.

The apparatuses and methods described in this specification may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

What is claimed is:

1. A computer implemented method for training a convolutional neural network for semantic segmentation and depth completion of images using a training set of image pairs, with each image pair in the training set having a visible image and a corresponding depth image, where at least one of the visible image and the corresponding depth image is semantically segmented, comprising:
    (a) training a first subnetwork of the neural network, the first subnetwork being a first encoder-decoder network with: (i) an encoder branch that generates an outputted first feature map from a visible image; and (ii) a decoder branch that generates a semantically segmented image from an inputted first feature map; wherein during training the encoder branch and the decoder branch of the first subnetwork are directly connected for setting the inputted first feature map as the outputted first feature map;
    (b) training a second subnetwork of the neural network, the second subnetwork being a second encoder-decoder network with: (i) an encoder branch of the second subnetwork generating an outputted second feature map from a depth image; and (ii) a decoder branch of the second subnetwork either generating a semantically segmented image or a depth image from an inputted second feature map; wherein during training the encoder branch and the decoder branch of the second subnetwork are directly connected for setting the inputted second feature map as the outputted second feature map; and
    (c) training a third subnetwork of the neural network arranged between the encoder branch and the decoder branch of the first subnetwork and the second subnetwork to reconstruct (i) the inputted first feature map from the outputted first feature map and (ii) the inputted second feature map from the outputted second feature map,
    wherein the third subnetwork is trained to generate a common representation of the outputted reconstructed feature maps for visible images and for depth images, allowing either the view from the first subnetwork or the view from the second subnetwork to be reconstructed therefrom.

2. The method of claim 1, wherein the third subnetwork comprises a multi-view autoencoder network with at least one hidden layer.

3. The method of claim 2, wherein the encoder branch of the first subnetwork and the second subnetwork comprise convolution layers of one of atrous and dilated.

4. The method of claim 3, wherein the training set of image pairs comprises a set of RGB-D images.

5. The method of claim 1, wherein said training (a) further comprises learning parameters of the first subnetwork.

6. The method of claim 5, wherein said training (b) further comprises learning parameters of the second subnetwork.

7. The method of claim 6, wherein said training (c) further comprises refining parameters of the first subnetwork and parameters of the second subnetwork.

8. The method of claim 1, wherein a first loss function is associated with the first subnetwork, a second loss function is associated with the second subnetwork, and a third loss function is associated with the third subnetwork, the first subnetwork being trained at said training (a) by minimizing the first loss function, the second subnetwork being trained at said training (b) by minimizing the first loss function, and the first subnetwork, second subnetwork and third subnetwork being trained at said training (c) by minimizing a weighted sum of the first loss function, the second loss function and a third loss function.

9. A computer-implemented method for semantic segmentation and/or depth completion of an inputted visible image and/or an inputted depth image, comprising:
    accessing a convolutional neural network (CNN) for semantic segmentation and/or depth completion of images; and
    performing semantic segmentation and/or depth completion of the inputted visible image and/or the inputted depth image using the CNN, comprising inputting a first subnetwork of the CNN with the inputted visible image and/or inputting a second subnetwork of the CNN with the inputted depth image,
    wherein the CNN is trained using a training set of image pairs, with each image pair in the training set having a visible image and a corresponding depth image, where at least one of the visible image and the corresponding depth image is semantically segmented, by at least one of:
(a) training the first subnetwork of the neural network, the first subnetwork being a first encoder-decoder network with: (i) an encoder branch that generates an outputted first feature map from a visible image; and (ii) a decoder branch that generates a semantically segmented image from an inputted first feature map; wherein during training the encoder branch and the decoder branch of the first subnetwork are directly connected for setting the inputted first feature map as the outputted first feature map;
(b) training the second subnetwork of the neural network, the second subnetwork being a second encoder-decoder network with: (i) an encoder branch of the second subnetwork generating an outputted second feature map from a depth image; and (ii) a decoder branch of the second subnetwork either generating a semantically segmented image or a depth image from an inputted second feature map; wherein during training the encoder branch and the decoder branch of the second subnetwork are directly connected for setting the inputted second feature map as the outputted second feature map; and
(c) training a third subnetwork of the neural network arranged between the encoder branch and the decoder branch of the first subnetwork and the second subnetwork to reconstruct (i) the inputted first feature map from the outputted first feature map and (ii) the inputted second feature map from the outputted second feature map;
wherein third subnetwork is trained to generate a common representation of the outputted reconstructed feature maps for visible images and for depth images, allowing either the view from the first subnetwork or the view from the second subnetwork to be reconstructed therefrom.

10. The method of claim 9, wherein the decoder branch of the second subnetwork generates a semantically segmented image from an inputted second feature map, and two semantically segmented images are produced at the respective outputs of the first subnetwork and the second subnetwork.

11. The method of claim 9, wherein the decoder branch of the second subnetwork generates a depth completion image from an inputted second feature map, and a semantically segmented image and a depth completion image are produced at the respective outputs of the first subnetwork the second subnetwork.

12. The method of claim 9, wherein the third subnetwork comprises a multi-view autoencoder network with at least one hidden layer.

13. The method of claim 12, wherein the encoder branch of the first subnetwork the second subnetwork comprise convolution layers of one of atrous and dilated.

14. The method of claim 13, wherein the training set of image pairs comprises a set of RGB-D images.

15. The method of claim 9, wherein said training (a) further comprises learning parameters of the first subnetwork.

16. The method of claim 15, wherein said training (b) further comprises learning parameters of the second subnetwork.

17. The method of claim 16, wherein said training (c) further comprises refining parameters of the first subnetwork and parameters of the second subnetwork.

18. The method of claim 9, wherein a first loss function is associated with the first subnetwork, a second loss function is associated with the second subnetwork, and a third loss function is associated with the third subnetwork, the first subnetwork being trained at said training (a) by minimizing the first loss function, the second subnetwork being trained at said training (b) by minimizing the first loss function, and the first subnetwork, second subnetwork and third subnetwork being trained at said training (c) by minimizing a weighted sum of the first loss function, the second loss function and a third loss function.

19. A computer-implemented method for generating a semantically segmented image and a depth completion image using a convolutional neural network (CNN) from an inputted visible image, comprising:
accessing from a memory the CNN having a first subnetwork, a second subnetwork and a third subnetwork; and
processing the inputted visible image using the first subnetwork of the CNN to produce a first runtime feature map;
processing the first runtime feature map using the third subnetwork of the CNN to produce a second runtime feature map and a third runtime feature map from a common representation;
processing the second runtime feature map using the first subnetwork of the CNN to produce the semantically segmented image;
processing the third runtime feature map using the second subnetwork of the CNN to produce the depth image; and
outputting the semantically segmented image and the depth image;
wherein the CCN is trained to produce the common representation using a training set of image pairs, with each image pair in the training set having a visible image and a corresponding depth image, where at least one of the visible image and the corresponding depth image is semantically segmented.

20. The method of claim 19, wherein the CCN is trained by:
(a) training the first subnetwork of the neural network, the first subnetwork being a first encoder-decoder network with: (i) an encoder branch that generates an outputted first feature map from a visible image; and (ii) a decoder branch that generates a semantically segmented image from an inputted first feature map; wherein during training the encoder branch and the decoder branch of the first subnetwork are directly connected for setting the inputted first feature map as the outputted first feature map;
(b) training the second subnetwork of the neural network, the second subnetwork being a second encoder-decoder network with: (i) an encoder branch of the second subnetwork generating an outputted second feature map from a depth image; and (ii) a decoder branch of the second subnetwork either generating a semantically segmented image or a depth image from an inputted second feature map; wherein during training the encoder branch and the decoder branch of the second subnetwork are directly connected for setting the inputted second feature map as the outputted second feature map; and
(c) training the third subnetwork of the neural network arranged between the encoder branch and the decoder branch of the first subnetwork the second subnetwork to reconstruct (i) the inputted first feature map from the outputted first feature map and (ii) the inputted second feature map from the outputted second feature map.

\* \* \* \* \*